(12) United States Patent
Ko et al.

(10) Patent No.: US 11,902,947 B2
(45) Date of Patent: Feb. 13, 2024

(54) METHOD AND APPARATUS FOR SELECTING RESOURCES BASED ON PARTIAL SENSING IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 17/858,818

(22) Filed: Jul. 6, 2022

(65) Prior Publication Data
US 2023/0080157 A1    Mar. 16, 2023

Related U.S. Application Data

(60) Provisional application No. 63/234,723, filed on Aug. 19, 2021, provisional application No. 63/234,685, filed on Aug. 18, 2021.

(30) Foreign Application Priority Data

| Jul. 6, 2021 | (KR) | 10-2021-0088426 |
| Aug. 4, 2021 | (KR) | 10-2021-0102719 |
| Aug. 6, 2021 | (KR) | 10-2021-0103900 |

(51) Int. Cl.
| H04W 72/04 | (2023.01) |
| H04W 74/08 | (2009.01) |
| H04L 1/18 | (2023.01) |
| H04W 72/0446 | (2023.01) |
| H04L 1/1812 | (2023.01) |

(52) U.S. Cl.
CPC ....... H04W 72/0446 (2013.01); H04L 1/1812 (2013.01); H04W 74/0808 (2013.01)

(58) Field of Classification Search
CPC .......... H04W 72/0446; H04W 74/0808; H04L 1/1812
See application file for complete search history.

(56) References Cited

U.S. PATENT DOCUMENTS

2023/0128828 A1* 4/2023 Ko .................... H04W 74/0808
370/329

OTHER PUBLICATIONS

NEC, "Discussion on resource allocation for power saving," 3GPP TSG-RAN WG1 #104b-e, e-Meeting, R1-2103517, Apr. 2021, 10 pages.

(Continued)

*Primary Examiner* — Melvin C Marcelo
(74) *Attorney, Agent, or Firm* — LEE, HONG, DEGERMAN, KANG & WAIMEY

(57) ABSTRACT

A method for a first device to perform wireless communication based on partial sensing and an apparatus supporting the same are provided. The method may comprise: triggering a resource selection procedure; determining a selection window within a packet delay budget (PDB) based on the triggering of the resource selection procedure; selecting Y candidate slots in the selection window; performing sensing within a contiguous partial sensing (CPS) window related to the Y candidate slots; and selecting a sidelink (SL) resource based on random selection within the selection window, based on the number of slots included in the CPS window which is less than a minimum number of slots, wherein Y is a positive integer.

20 Claims, 22 Drawing Sheets

(56) References Cited

OTHER PUBLICATIONS

Futurewei, "Power consumption reduction for sidelink resource allocation," 3GPP TSG-RAN WG1 Meeting #104-bis-e, e-Meeting, R1-2102780, Apr. 2021, 9 pages.
Huawei, HiSilicon, "Sidelink resource allocation to reduce power consumption," 3GPP TSG-RAN WG1 Meeting #105- e, e-Meeting, R1-2104236, May 2021, 25 pages.
Korean Intellectual Property Office Application Serial No. 10-2022-0082681, Office Action dated Jul. 25, 2022, 6 pages.
CATT, "Discussion on resource allocation for power saving," 3GPP TSG-RAN WG1 #105-e, R1-2104489, May 2021, 26 pages.
Korean Intellectual Property Office Application Serial No. 10-2022-0082681, Final Office Action dated Dec. 26, 2022, 6 pages.

\* cited by examiner

METHOD AND APPARATUS FOR SELECTING RESOURCES BASED ON PARTIAL SENSING IN NR V2X

CROSS-REFERENCE TO RELATED APPLICATIONS

Pursuant to 35 U.S.C. § 119, this application claims the benefit of earlier filing date and right of priority to Korean Application Nos. 10-2021-0088426, filed on Jul. 6, 2021, 10-2021-0102719, filed Aug. 4, 2021, 10-2021-0103900, filed Aug. 6, 2021, and also claims the benefit of U.S. Provisional Application Nos. 63/234,685, filed Aug. 18, 2021, and 63/234,723, filed Aug. 19, 2021, the contents of which are all incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, in case the UE performs partial sensing, if the length of a partial sensing window (e.g., the number of slots for partial sensing) is not guaranteed, it is necessary for the UE to determine whether to use a result of the partial sensing. If the length of a partial sensing window (e.g., the number of slots for partial sensing) is not guaranteed, it is necessary for the UE to determine whether to use a result of the insufficient partial sensing because the UE cannot accurately detect a collision for some slots in a selection window.

In one embodiment, provided is a method for performing wireless communication based on partial sensing by a first device. The method may comprise: triggering a resource selection procedure; determining a selection window within a packet delay budget (PDB) based on the triggering of the resource selection procedure; selecting Y candidate slots in the selection window; performing sensing within a contiguous partial sensing (CPS) window related to the Y candidate slots; and selecting a sidelink (SL) resource based on random selection within the selection window, based on the number of slots included in the CPS window which is less than a minimum number of slots, wherein Y is a positive integer.

In one embodiment, provided is a first device adapted to perform wireless communication based on partial sensing. The first device may comprise: one or more memories storing instructions; one or more transceivers; and one or more processors connected to the one or more memories and the one or more transceivers, wherein the one or more processors execute the instructions to: trigger a resource selection procedure; determine a selection window within a packet delay budget (PDB) based on the triggering of the resource selection procedure; select Y candidate slots in the selection window; perform sensing within a contiguous partial sensing (CPS) window related to the Y candidate slots; and select a sidelink (SL) resource based on random selection within the selection window, based on the number of slots included in the CPS window which is less than a minimum number of slots, wherein Y is a positive integer.

In one embodiment, provided is a processing device adapted to control a first device adapted to perform wireless communication based on partial sensing. The processing device may comprise: one or more processors; and one or more memories operably connected to the one or more processors and storing instructions, wherein the one or more processors execute the instructions to: trigger a resource selection procedure; determine a selection window within a packet delay budget (PDB) based on the triggering of the resource selection procedure; select Y candidate slots in the selection window; perform sensing within a contiguous partial sensing (CPS) window related to the Y candidate slots; and select a sidelink (SL) resource based on random selection within the selection window, based on the number of slots included in the CPS window which is less than a minimum number of slots, wherein Y is a positive integer.

The power saving gain of the UE can be maximized and the reliability of SL communication can be secured.

DETAILED DESCRIPTION

Figure 1:
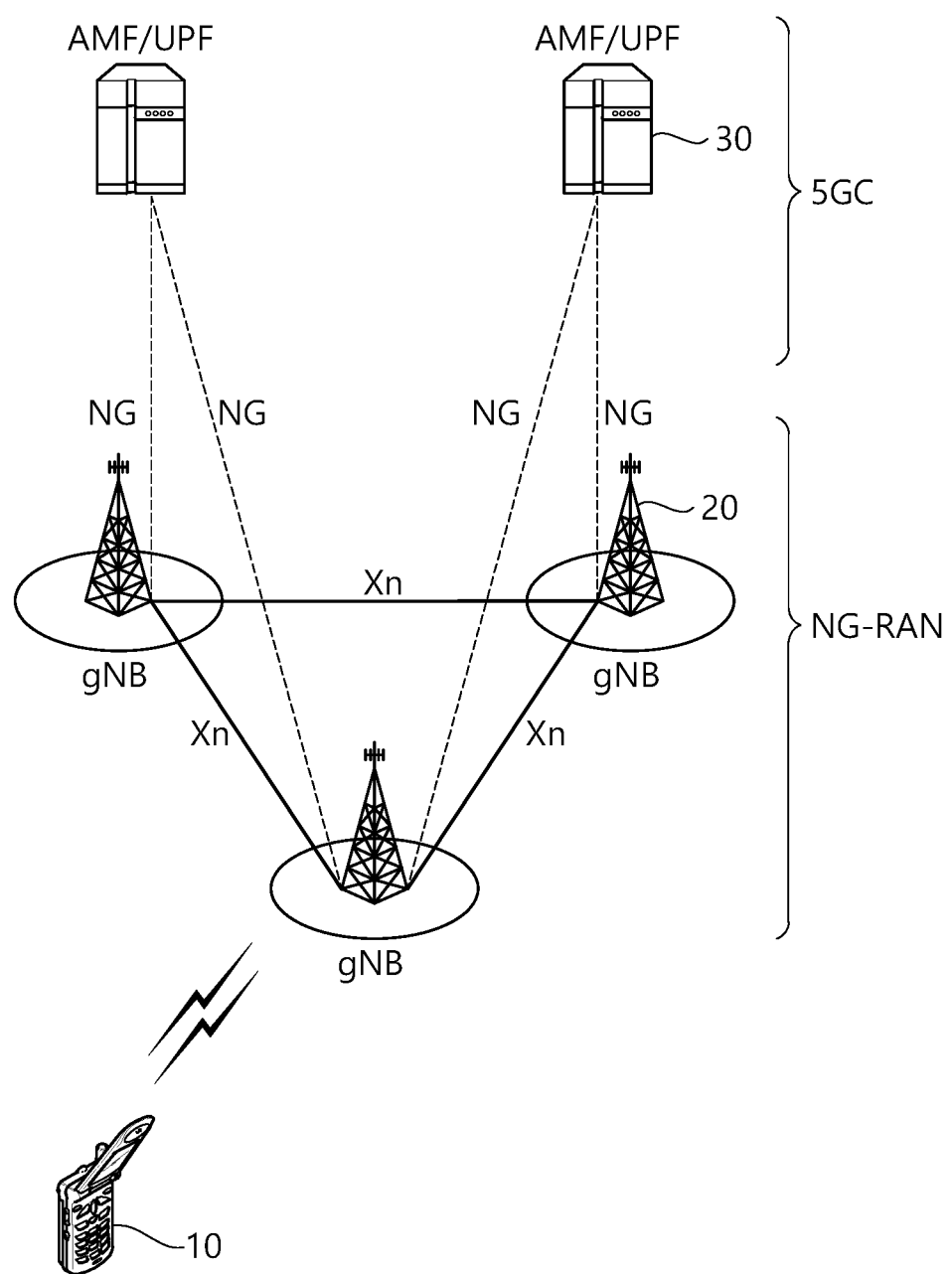
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if', or 'in case of may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
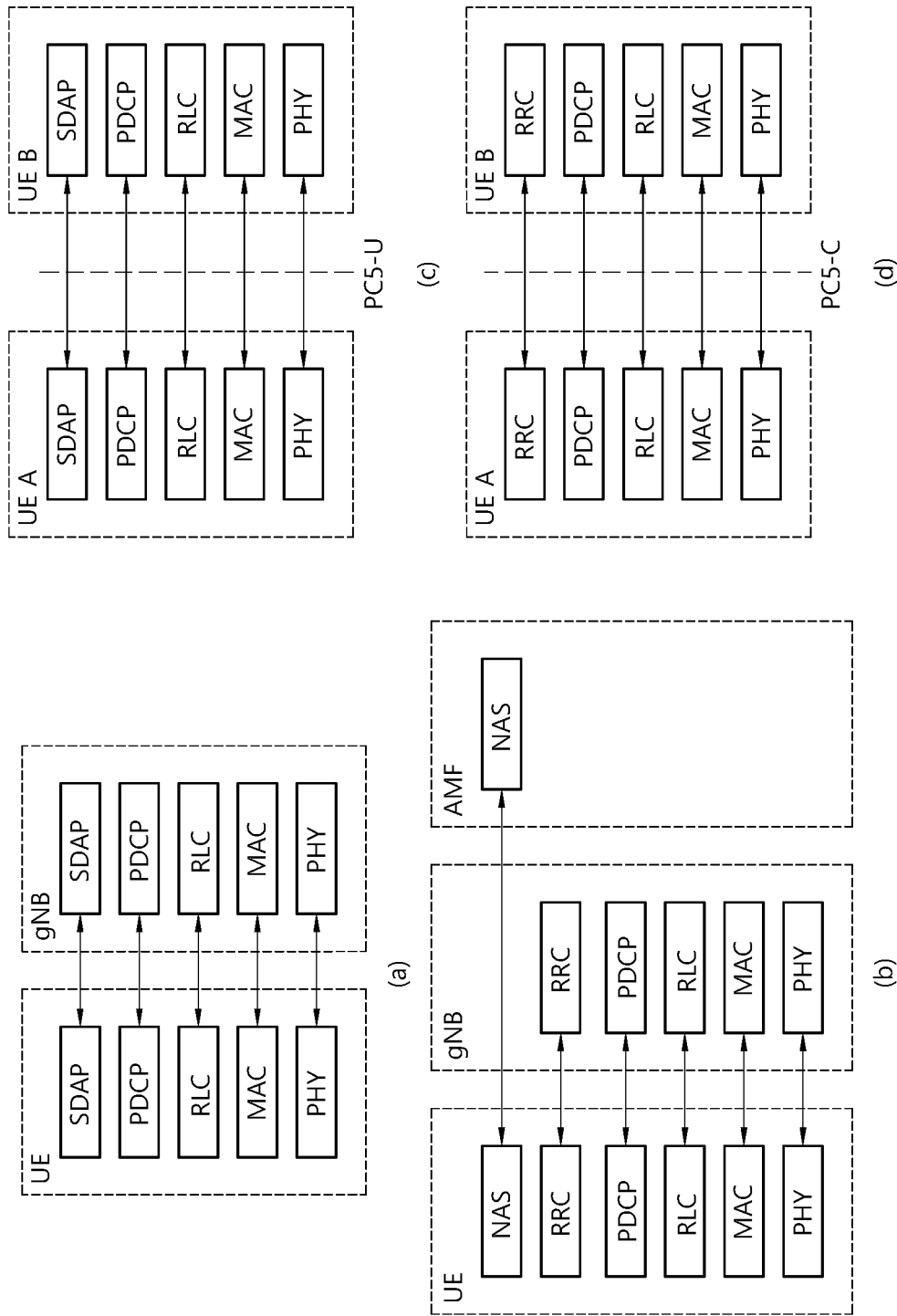
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
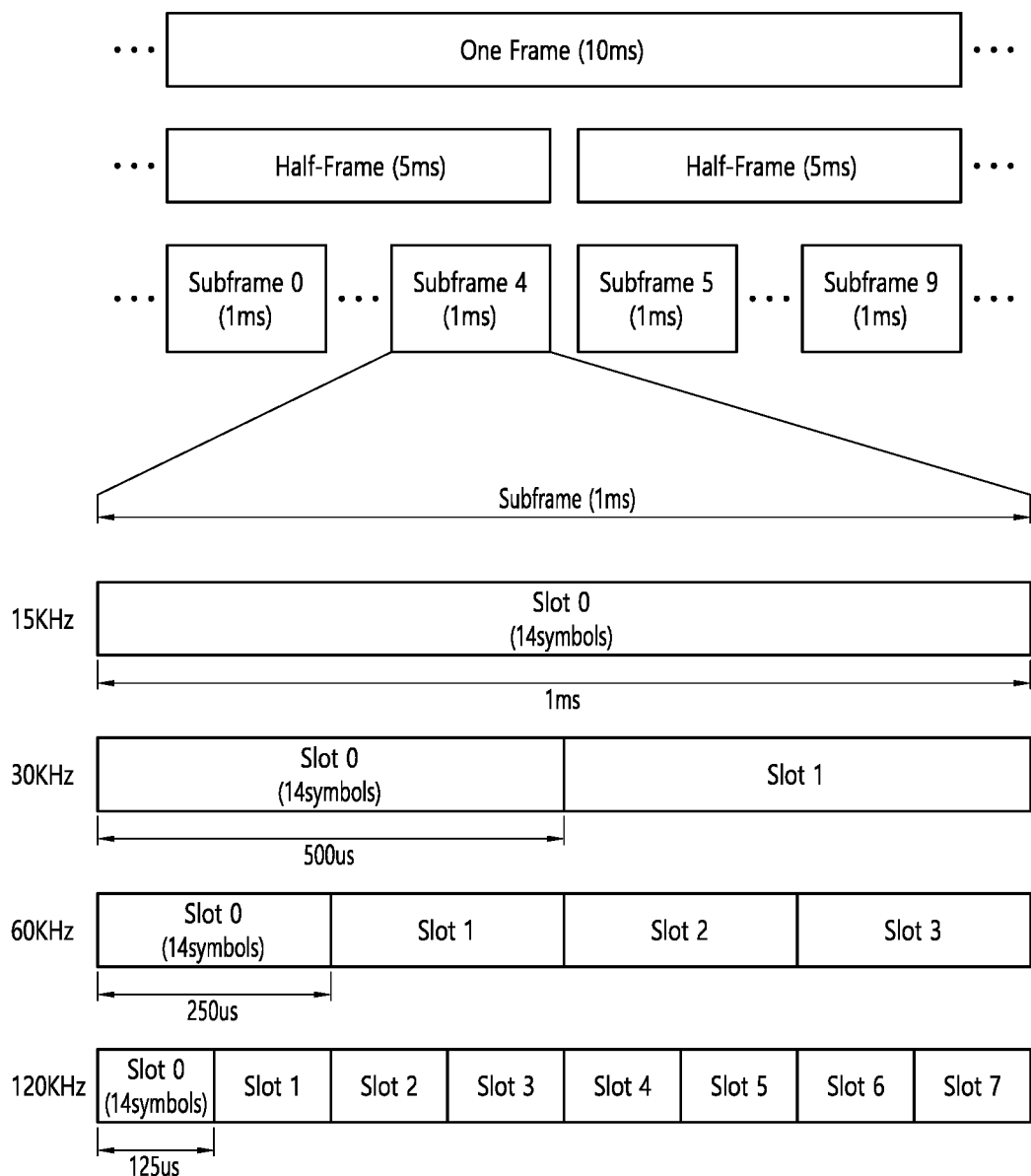
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
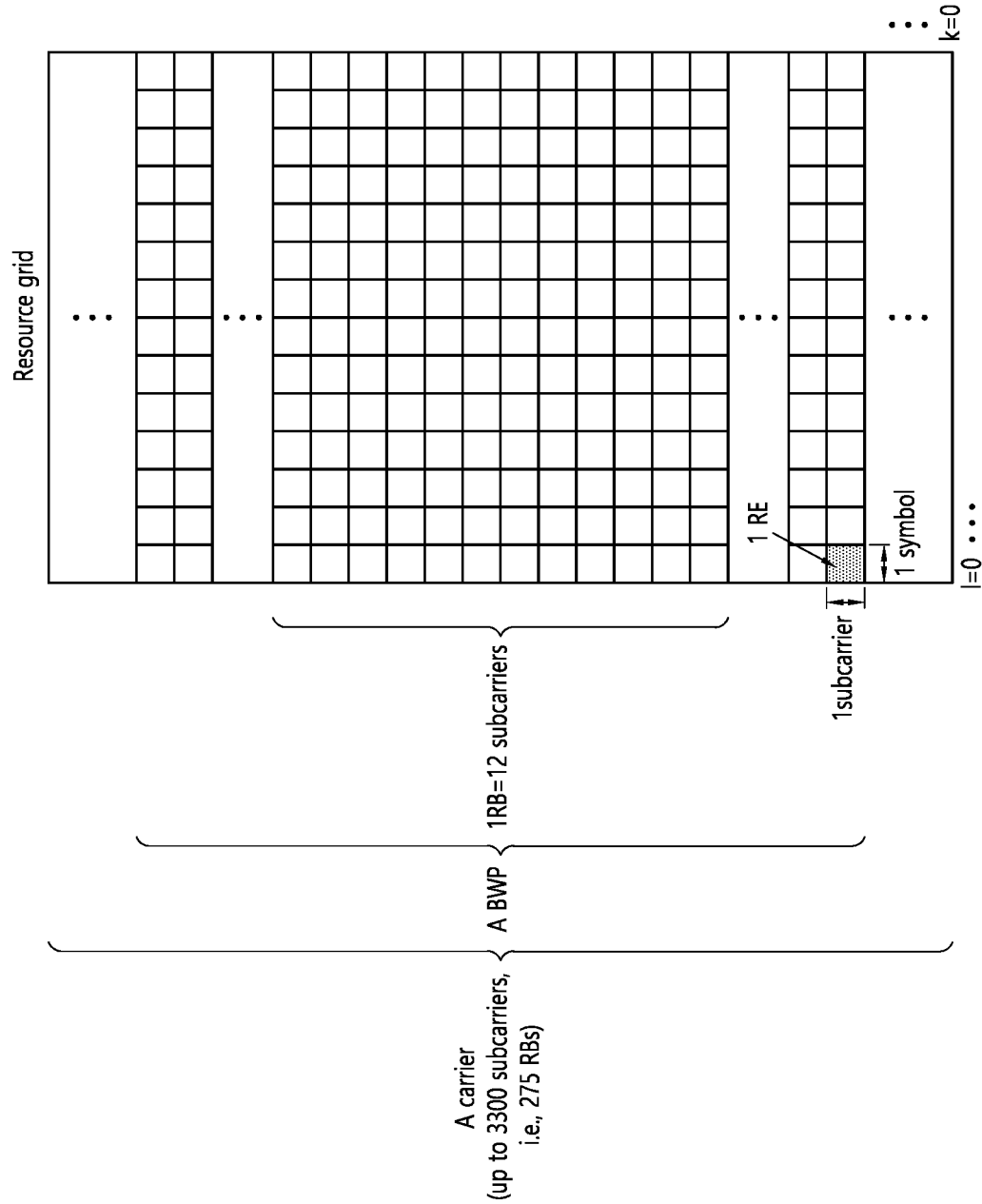
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
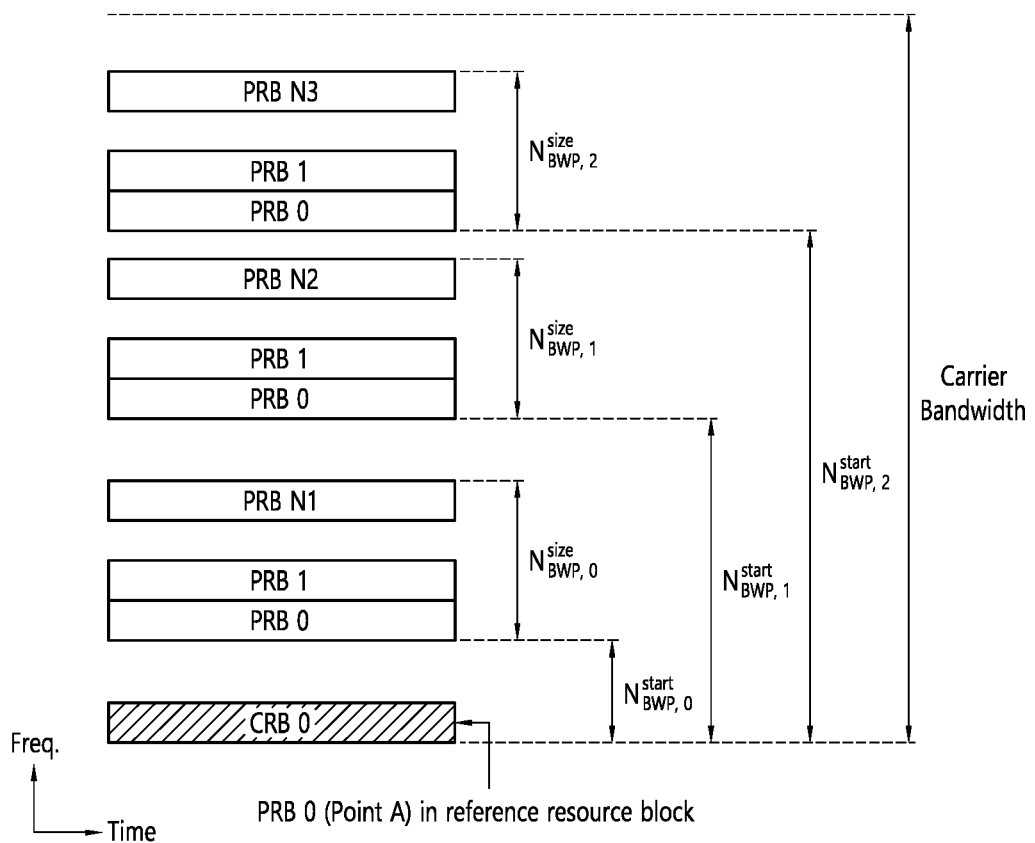
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
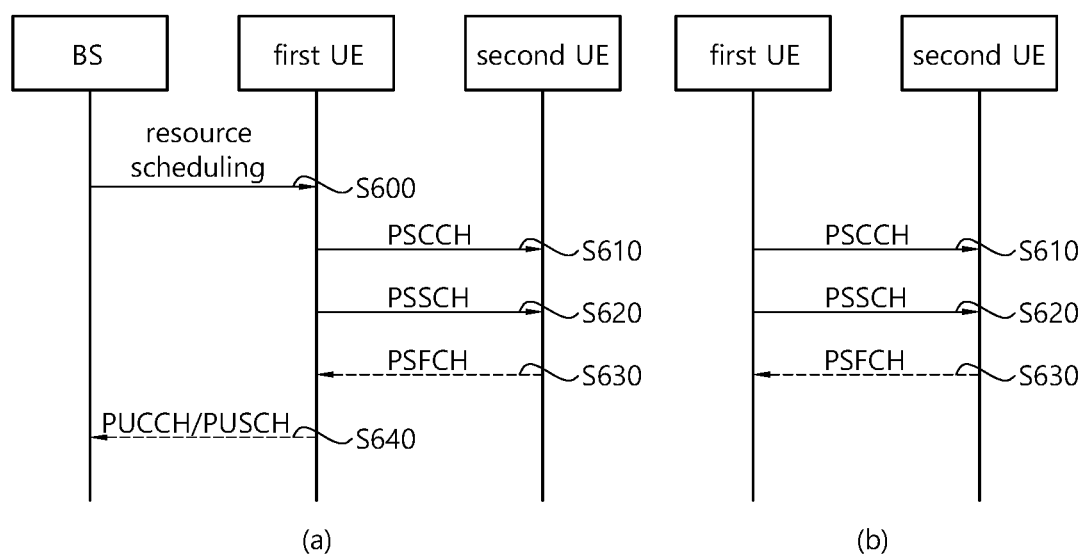
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index—ceiling ($\log_2$ I) bits, where I is the number of resource pools for transmission configured by the higher layer parameter sl-TxPoolScheduling.

Time gap—3 bits determined by higher layer parameter sl-DCI-ToSL-Trans

HARQ process number—4 bits

New data indicator—1 bit

Lowest index of the subchannel allocation to the initial transmission—ceiling ($\log_2(N^{SL}_{subChannel})$) bits SCI format 1—A fields: frequency resource assignment, time resource assignment PSFCH-to-HARQ feedback timing indicator—ceiling ($\log_2 N_{fb\_timing}$) bits, where $N_{fb\_timing}$ is the number of entries in the higher layer parameter sl-PSFCH-To-PUCCH.

PUCCH resource indicator—3 bits

Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling ($\log_2 (N^{SL}_{subChannel}(N^{SL}_{subChannel}+1)/2)$) bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format—2 bits as defined in Table 5

Beta offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:
 HARQ process number—4 bits
 New data indicator—1 bit
 Redundancy version—2 bits
 Source ID—8 bits
 Destination ID—16 bits
 HARQ feedback enabled/disabled indicator—1 bit
 Cast type indicator—2 bits as defined in Table 7
 CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:
 HARQ process number—4 bits
 New data indicator—1 bit
 Redundancy version—2 bits
 Source ID—8 bits
 Destination ID—16 bits
 HARQ feedback enabled/disabled indicator—1 bit
 Zone ID—12 bits
 Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
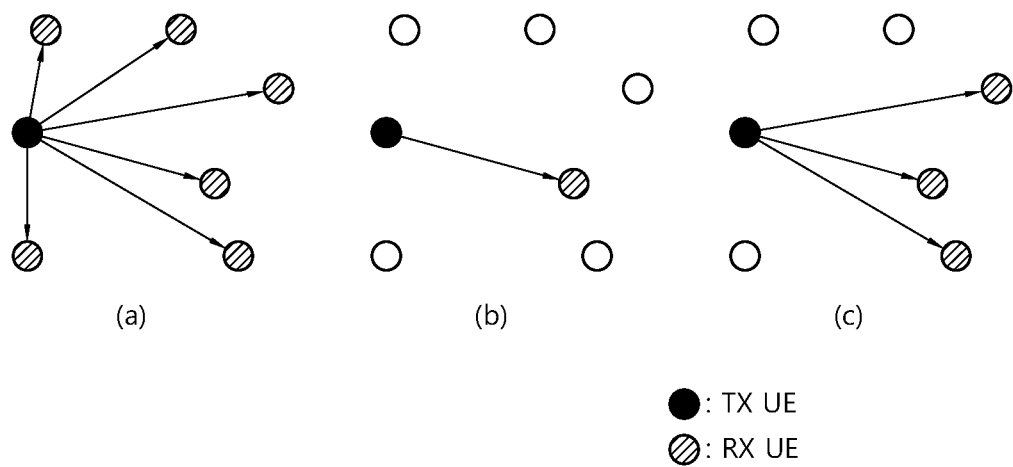
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

Hereinafter, UE procedure for reporting HARQ-ACK on sidelink will be described.

A UE can be indicated by an SCI format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k$ ($0 \leq k < T'_{max}$) has a PSFCH transmission occasion resource if k mod $N^{PSFCH}_{PSSCH}=0$, where $t'^{SL}_k$ is a slot that belongs to the resource pool, $T'_{max}$ is a number of slots that belong to the resource pool within 10240 msec, and $N^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $[(i+j \cdot N^{PSFCH}_{PSSCH}) \cdot M^{PSFCH}_{subch,slot}, (i+1+j \cdot N^{PSFCH}_{PSSCH}) \cdot M^{PSFCH}_{subch,slot}-1]$ PRBs from the $M^{PSFCH}_{PRB,set}$ PRBs to slot i among the PSSCH slots associated with the PSFCH slot and sub-channel j, where $M^{PSFCH}_{subch,slot}=M^{PSFCH}_{PRB,set}/(N_{subch} \cdot N^{PSFCH}_{PSSCH})$, $0 \leq i < N^{PSFCH}_{PSSCH}$, $0 \leq j < N_{subch}$, and the allocation starts in an ascending order of i and continues in an ascending order of j. The UE expects that $M^{PSFCH}_{PRB,set}$ is a multiple of $N_{subch} \cdot N^{PSFCH}_{PSSCH}$.

A UE determines a number of PSFCH resources available for multiplexing HARQ-ACK information in a PSFCH transmission as $R^{PSFCH}_{PRB,CS}=N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool and, based on an indication by higher layers, $N^{PSFCH}_{type}=1$ and the $M^{PSFCH}_{subch,slot}$ PRBs are associated with the starting sub-channel of the corresponding PSSCH $N^{PSFCH}_{type}=N^{PSSCH}_{subch}$ and the $N^{PSSCH}_{subch} \cdot M^{PSFCH}_{subch,slot}$ PRBs are associated with one or more sub-channels from the $N^{PSSCH}_{subch}$ sub-channels of the corresponding PSSCH The PSFCH resources are first indexed according to an ascending order of the PRB index, from the $N^{PSFCH}_{type} \cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID}+M_{ID})$ mod $R^{PSFCH}_{PRB,CS}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift $\alpha$, from a cyclic shift pair index corresponding to a PSFCH resource index and from $N^{PSFCH}_{CS}$ using Table 8.

TABLE 8

| | $m_0$ | | | | | |
|---|---|---|---|---|---|---|
| $N^{PSFCH}_{CS}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift $\alpha$, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

| HARQ-ACK Value | 0 (NACK) | 1 (ACK) |
|---|---|---|
| Sequence cyclic shift | 0 | 6 |

| HARQ-ACK Value | 0 (NACK) | 1 (ACK) |
|---|---|---|
| Sequence cyclic shift | 0 | N/A |

Hereinafter, UE procedure for determining the subset of resources to be reported to higher layers in PSSCH resource selection in sidelink resource allocation mode 2 will be described.

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;

L1 priority, $prio_{TX}$;

the remaining packet delay budget;

the number of sub-channels to be used for the PSSCH/PSCCH transmission in a slot, $L_{subCH}$;

optionally, the resource reservation interval, $P_{rsvpTX}$, in units of msec.

if the higher layer requests the UE to determine a subset of resources from which the higher layer will select resources for PSSCH/PSCCH transmission as part of re-evaluation or pre-emption procedure, the higher layer provides a set of resources ($r_0, r_1, r_2, \ldots$) which may be subject to re-evaluation and a set of resources ($r'_0, r'_1, r'_2, \ldots$) which may be subject to pre-emption. it is up to UE implementation to determine the subset of resources as requested by higher layers before or after the slot $r_i''-T_3$ where $r_i''$ is the slot with the smallest slot index among ($r_0, r_1, r_2, \ldots$) and ($r'_0, r'_1, r'_2, \ldots$), and $T_3$ is equal to $T^{SL}_{proc,1}$, where $T^{SL}_{proc,1}$ is defined as the number of slots determined based on a SCS configuration of a SL BWP, where $\mu_{SL}$ is the SCS configuration of the SL BWP.

The following higher layer parameters affect this procedure:

- sl-SelectionWindowList: internal parameter $T_{2min}$ is set to the corresponding value from higher layer parameter sl-SelectionWindowList for the given value of $prio_{TX}$.
- sl-Thres-RSRP-List: this higher layer parameter provides an RSRP threshold for each combination ($p_i, p_j$), where $p_i$ is the value of the priority field in a received SCI format 1-A and $p_j$ is the priority of the transmission of the UE selecting resources; for a given invocation of this procedure, $p_j = prio_{TX}$.
- sl-RS-ForSensing selects if the UE uses the PSSCH-RSRP or PSCCH-RSRP measurement.
- sl-ResourceReservePeriodList
- sl-SensingWindow: internal parameter $T_0$ is defined as the number of slots corresponding to sl-SensingWindow msec.
- sl-TxPercentageList: internal parameter X for a given $prio_{TX}$ is defined as sl-TxPercentageList ($prio_{TX}$) converted from percentage to ratio.
- sl-PreemptionEnable: if sl-PreemptionEnable is provided, and if it is not equal to 'enabled', internal parameter $prio_{pre}$ is set to the higher layer provided parameter sl-PreemptionEnable.

The resource reservation interval, $P_{rsvp\_TX}$, if provided, is converted from units of msec to units of logical slots, resulting in $P'_{rsvp\_TX}$.

Notation:

($t'^{SL}_0, t'^{SL}_1, t'^{SL}_2, \ldots$) denotes the set of slots which belongs to the sidelink resource pool.

For example, the UE may select a set of candidate resources ($S_A$) based on Table 11. For example, if resource (re)selection is triggered, the UE may select a set of candidate resources ($S_A$) based on Table 11. For example, if re-evaluation or pre-emption is triggered, the UE may select a set of candidate resources ($S_A$) based on Table 11.

TABLE 11

The following steps are used:
1) A candidate single-slot resource for transmission $R_{x,y}$ is defined as a set of $L_{subCH}$ contiguous sub-channels with sub-channel x+j in slot $t'^{SL}_y$ where $j = 0, \ldots, L_{subCH} - 1$. The UE shall assume that any set of $L_{subCH}$ contiguous sub-channels included in the corresponding resource pool within the time interval [n + $T_1$, n + $T_2$] correspond to one candidate single-slot resource, where
   - selection of $T_1$ is up to UE implementation under $0 \le T_1 \le T^{SL}_{proc,1}$, where $T^{SL}_{proc,1}$ is defined in slots in Table 8.1.4-2 where $\mu_{SL}$ is the SCS configuration of the SL BWP;
   - if $T_{2min}$ is shorter than the remaining packet delay budget (in slots) then $T_2$ is up to UE implementation subject to $T_{2min} \le T_2 \le$ remaining packet delay budget (in slots); otherwise $T_2$ is set to the remaining packet delay budget (in slots).
   The total number of candidate single-slot resources is denoted by $M_{total}$.
2) The sensing window is defined by the range of slots [n − $T_0$, n − $T^{SL}_{proc,0}$) where $T_0$ is defined above and $T^{SL}_{proc,0}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.
3) The internal parameter Th ($p_i, p_j$) is set to the corresponding value of RSRP threshold indicated by the i-th field in sl-Thres-RSRP-List, where $i = p_i + (p_j − 1) * 8$.
4) The set $S_A$ is initialized to the set of all the candidate single-slot resources.
5) The UE shall exclude any candidate single-slot resource $R_{x,y}$ from the set $S_A$ if it meets all the following conditions:
   - the UE has not monitored slot $t'^{SL}_m$ in Step 2.
   - for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met.
5a) If the number of candidate single-slot resources $R_{x,y}$ remaining in the set $S_A$ is smaller than X · $M_{total}$, the set $S_A$ is initialized to the set of all the candidate single-slot resources as in step 4.
6) The UE shall exclude any candidate single-slot resource $R_{x,y}$ from the set $S_A$ if it meets all the following conditions:
   a) the UE receives an SCI format 1-A in slot $t'^{SL}_m$ and 'Resource reservation period' field, if present, and 'Priority' field in the received SCI format 1-A indicate the values $P_{rsvp\_RX}$ and $prio_{RX}$, respectively;
   b) the RSRP measurement performed, for the received SCI format 1-A, is higher than Th($prio_{RX}, prio_{TX}$);
   c) the SCI format received in slot $t'^{SL}_m$, or the same SCI format which, if and only if the 'Resource reservation period' field is present in the received SCI format 1-A, is assumed to be received in slot(s) $t'^{SL}_{m+q \times P'_{rsvp\_RX}}$ determines the set of resource blocks and slots which overlaps with $R_{x,y+j \times P'_{rsvp\_TX}}$ for q=1, 2, …, Q and j=0,1, …, $C_{resel} - 1$. Here, $P'_{rsvp\_RX}$ is $P_{rsvp\_RX}$ converted to units of logical slots, $$Q = \left\lceil \frac{T_{scal}}{P_{rsvp\_RX}} \right\rceil \text{ if } P_{rsvp\_RX} < T_{scal} \text{ and } n' - m \le P'_{rsvp\_RX},$$

where $t'^{SL}_n = n$ if slot n belongs to the set ($t'^{SL}_0, t'^{SL}_1, \ldots, t'^{SL}_{T_{max}-1}$), otherwise slot $t'^{SL}_n$ is the first slot after slot n belonging to the set ($t'^{SL}_0, t'^{SL}_1, \ldots, t'^{SL}_{T_{max}-1}$); otherwise Q = 1. $T_{scal}$ is set to selection window size $T_2$ converted to units of msec.

TABLE 11-continued

7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.

The UE shall report set $S_A$ to higher layers.
If a resource $r_i$ from the set $(r_0, r_1, r_2, ... )$ is not a member of $S_A$, then the UE shall report re-evaluation of the resource $r_i$ to higher layers.
If a resource $r_i'$ from the set $(r_0', r_1', r_2', ... )$ meets the conditions below then the UE shall report pre-emption of the resource $r_i'$ to higher layers
- $r_i'$ is not a member of $S_A$, and
- $r_i'$ meets the conditions for exclusion in step 6, with $Th(prio_{RX}, prio_{TX})$ set to the final threshold after executing steps 1)-7), i.e. including all necessary increments for reaching $X \cdot M_{total}$, and
- the associated priority $prio_{RX}$, satisfies one of the following conditions:
  - sl-PreemptionEnable is provided and is equal to 'enabled' and $prio_{TX} > prio_{RX}$
  - sl-PreemptionEnable is provided and is not equal to 'enabled', and $prio_{RX} < prio_{pre}$ and $prio_{TX} > prio_{RX}$ Meanwhile, partial sensing may be supported for power saving of the UE. For example, in LTE SL or LTE V2X, the UE may perform partial sensing based on Tables 12 and 13.

TABLE 12

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{Tx}$ the priority to be transmitted in the associated SCI format 1 by the UE are all provided by higher layers.
In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers.
$C_{resel}$ is determined by $C_{resel} = 10*SL\_RESOURCE\_RESELECTION\_COUNTER$, where SL_RESOURCE_RESELECTION_COUNTER is provided by higher layers.
...
If partial sensing is configured by higher layers then the following steps are used:
  1) A candidate single-subframe resource for PSSCH transmission $R_{x,y}$ is defined as a set of $L_{subCH}$ contiguous sub-channels with sub-channel $x+j$ in subframe $t_y^{SL}$ where $j = 0,..., L_{subCH} - 1$. The UE shall determine by its implementation a set of subframes which consists of at least Y subframes within the time interval $[n + T_1, n + T_2]$ where selections of $T_1$ and $T_2$ are up to UE implementations under $T_1 \leq 4$ and $T_{2min}(prio_{TX}) < T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool within the determined set of subframes correspond to one candidate single-subframe resource. The total number of the candidate single-subframe resources is denoted by $M_{total}$.
  2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.
  3) The parameter $Th_{a,b}$ is set to the value indicated by the i-th SL-ThresPSSCH-RSRP field in SL-ThresPSSCH-RSRP-List where $i = (a - 1) * 8 + b$.
  4) The set $S_A$ is initialized to the union of all the candidate single-subframe resources. The set $S_B$ is initialized to an empty set.
  5) The UE shall exclude any candidate single-subframe resource $R_{x,y}$ from the set $S_A$ if it meets all the following conditions:
    - the UE receives an SCI format 1 in subframe $t_m^{SL}$, and "Resource reservation" field and "Priority" field in the received SCI format 1 indicate the values $P_{rsvp\_RX}$ and $prio_{RX}$, respectively.
    - PSSCH-RSRP measurement according to the received SCI format 1 is higher than $Th_{prio_{TX}, prio_{TX}}$.
    - the SCI format received in subframe $t_m^{SL}$ or the same SCI format 1 which is assumed to be received in subframe(s) $t_{m+q \times P_{step} \times P_{rsvp\_RX}}$ determines according to 14.1.1.4C the set of resource blocks and subframes which overlaps with $R_{x,y+j \times P'_{rsvp\_TX}}$ for $q=1,2, ..., Q$ and $j=0, 1, ..., C_{resel} - 1$. Here, $$Q = \frac{1}{P_{rsvp\_RX}} \text{ if } P_{rsvp\_RX} < 1 \text{ and } y' - m \leq P_{step} \times P_{rsvp\_RX} + P_{step},$$

where $t_y^{SL}$ is the last subframe of the Y subframes, and $Q = 1$ otherwise.
  6) If the number of candidate single-subframe resources remaining in the set $S_A$ is smaller than $0.2 \cdot M_{total}$, then Step 4 is repeated with $Th_{a,b}$ increased by 3 dB.

TABLE 13

7) For a candidate single-subframe resource $R_{x, y}$ remaining in the set $S_A$, the metric $E_{x, y}$ is defined as the linear average of S-RSSI measured in sub-channels $x + k$ for $k = 0, ..., L_{subCH} - 1$ in the monitored subframes in Step 2 that can be expressed by $t_{y-P_{step}*j}^{SL}$ for a non-negative integer j.

TABLE 13-continued

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.
9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time.

The UE shall report set $S_B$ to higher layers.

If transmission based on random selection is configured by upper layers and when the UE is configured by upper layers to transmit using resource pools on multiple carriers, the following steps are used:

1) A candidate single-subframe resource for PSSCH transmission $R_{x,y}$ is defined as a set of $L_{subCH}$ contiguous sub-channels with sub-channel $x - j$ in subframe $t_y^{SL}$ where $j = 0, \ldots, L_{subCH} - 1$. The UE shall assume that any set of $L_{subCH}$ contiguous sub-channels included in the corresponding PSSCH resource pool within the time interval $[n + T_1, n + T_2]$ corresponds to one candidate single-subframe resource, where selections of $T_1$ and $T_2$ are up to UE implementations under $T_1 \leq 4$ and $T_{2\,min}$ (prio$_{TX}$) $\leq T_2 \leq 100$, if $T_{2\,min}$ (prio$_{TX}$) is provided by higher layers for prio$_{TX}$, otherwise $20 \leq T_2 \leq 100$. UE selection of $T_2$ shall fulfil the latency requirement. The total number of the candidate single-subframe resources is denoted by $M_{total}$.
2) The set $S_A$ is initialized to the union of all the candidate single-subframe resources. The set $S_B$ is initialized to an empty set.
3) The UE moves the candidate single-subframe resource $R_{x,y}$ from the set $S_A$ to $S_B$.
4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time.

The UE shall report set $S_B$ to higher layers.

Meanwhile, in NR V2X, a re-evaluation procedure or a pre-emption procedure may be supported. For example, the UE which has determined SL candidate resource(s) based on sensing may determine whether to reselect the SL candidate resource(s) through the re-evaluation procedure or the pre-emption procedure before using the SL candidate resource(s).

Figure 8:
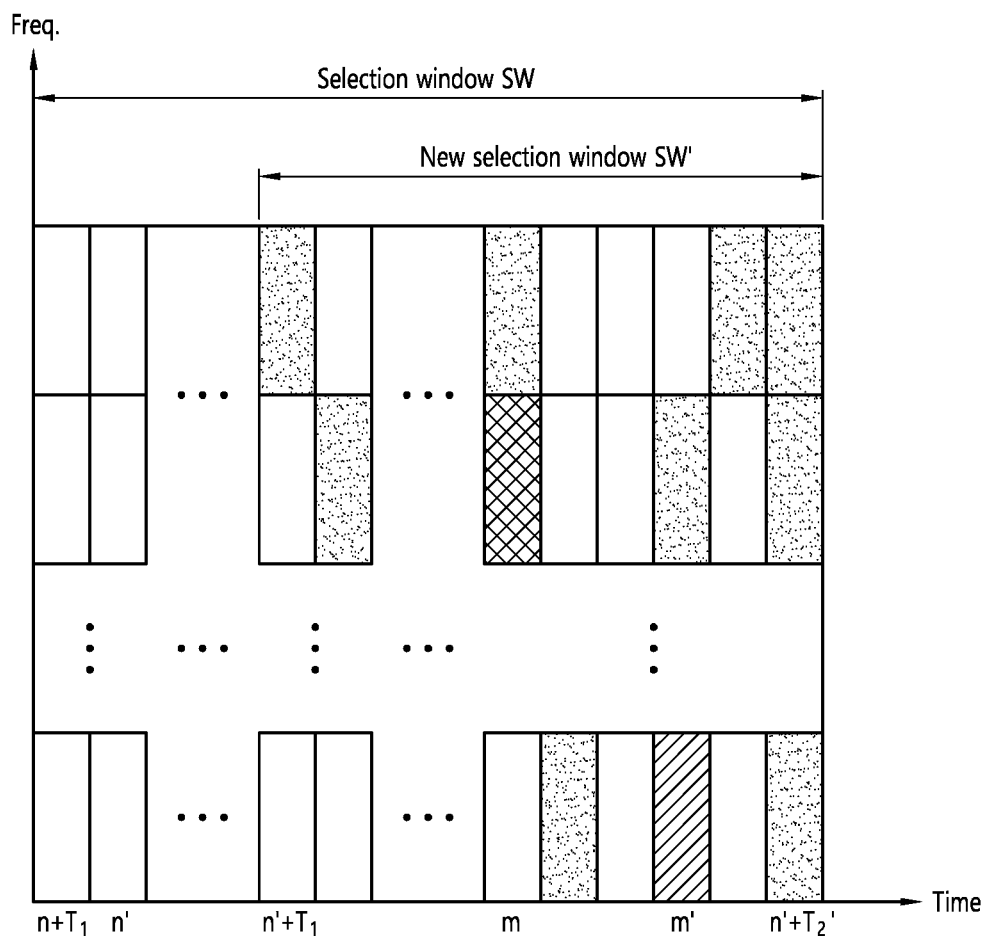
FIG. 8 shows a method for a UE to reselect a resource through a re-evaluation procedure or a pre-emption procedure, based on an embodiment of the present disclosure.

FIG. 8 shows a method for a UE to reselect a resource through a re-evaluation procedure or a pre-emption procedure, based on an embodiment of the present disclosure. The embodiment of FIG. 8 may be combined with various embodiments of the present disclosure.

Referring to FIG. 8, it is assumed that the UE selects a first resource (i.e., initially selected resource) in the slot m within the selection window. In this case, the UE may continuously perform sensing through the re-evaluation procedure or the pre-emption procedure before the first resource is actually used, and the UE may detect a collision for the first resource. In this case, the UE may reselect the first resource in the slot m as a second resource (i.e., new selected resource) in the slot m'. The re-evaluation procedure or the pre-emption procedure is specifically described in Table 11.

Meanwhile, the conventional partial sensing has a problem in that efficiency such as power consumption decreases because sensing is performed regardless of a channel environment, UE operation, etc.

Meanwhile, in case the UE performs partial sensing, if the length of a partial sensing window (e.g., the number of slots for partial sensing) is not guaranteed, it is necessary for the UE to determine whether to use a result of the partial sensing. If the length of a partial sensing window (e.g., the number of slots for partial sensing) is not guaranteed, it is necessary for the UE to determine whether to use a result of the insufficient partial sensing because the UE cannot accurately detect a collision for some slots in a selection window.

Based on various embodiments of the present disclosure, a method for optimizing the length of a partial sensing window and a sensing time in consideration of a channel environment and UE power consumption, and an apparatus supporting the same are proposed. Based on various embodiments of the present disclosure, a method for a UE to select a SL resource if the number of slots for partial sensing is not guaranteed, and an apparatus supporting the same are proposed.

For example, in various embodiments of the present disclosure, periodic-based partial sensing (PPS) may refer to an operation of performing sensing at the time corresponding to an integer multiple k of each period based on the number of periods corresponding to a specific configured value when performing sensing for resource selection. For example, the periods may be periods of transmission resources configured in a resource pool. For example, the UE may sense resource(s) at the time that is earlier in time by an integer multiple k of each period from the time of candidate resource(s) to be determined whether or not a resource collision occurs. For example, the k value may be configured in the form of a bitmap. In the present disclosure, the PPS may be referred to as PBPS.

Figure 9:
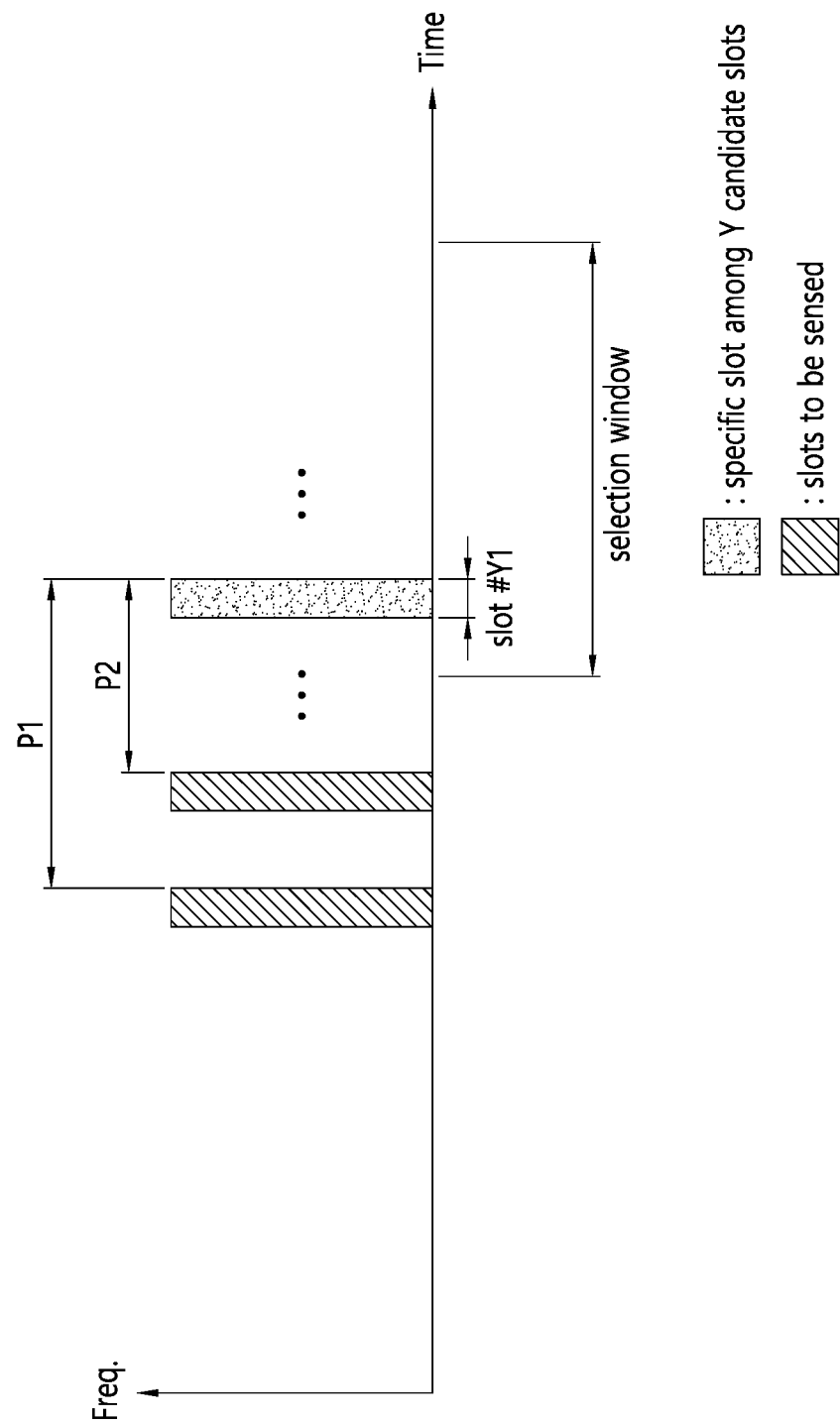
FIG. 9 and FIG. 10 show a method for a UE to perform PBPS, based on an embodiment of the present disclosure.
Figure 10:
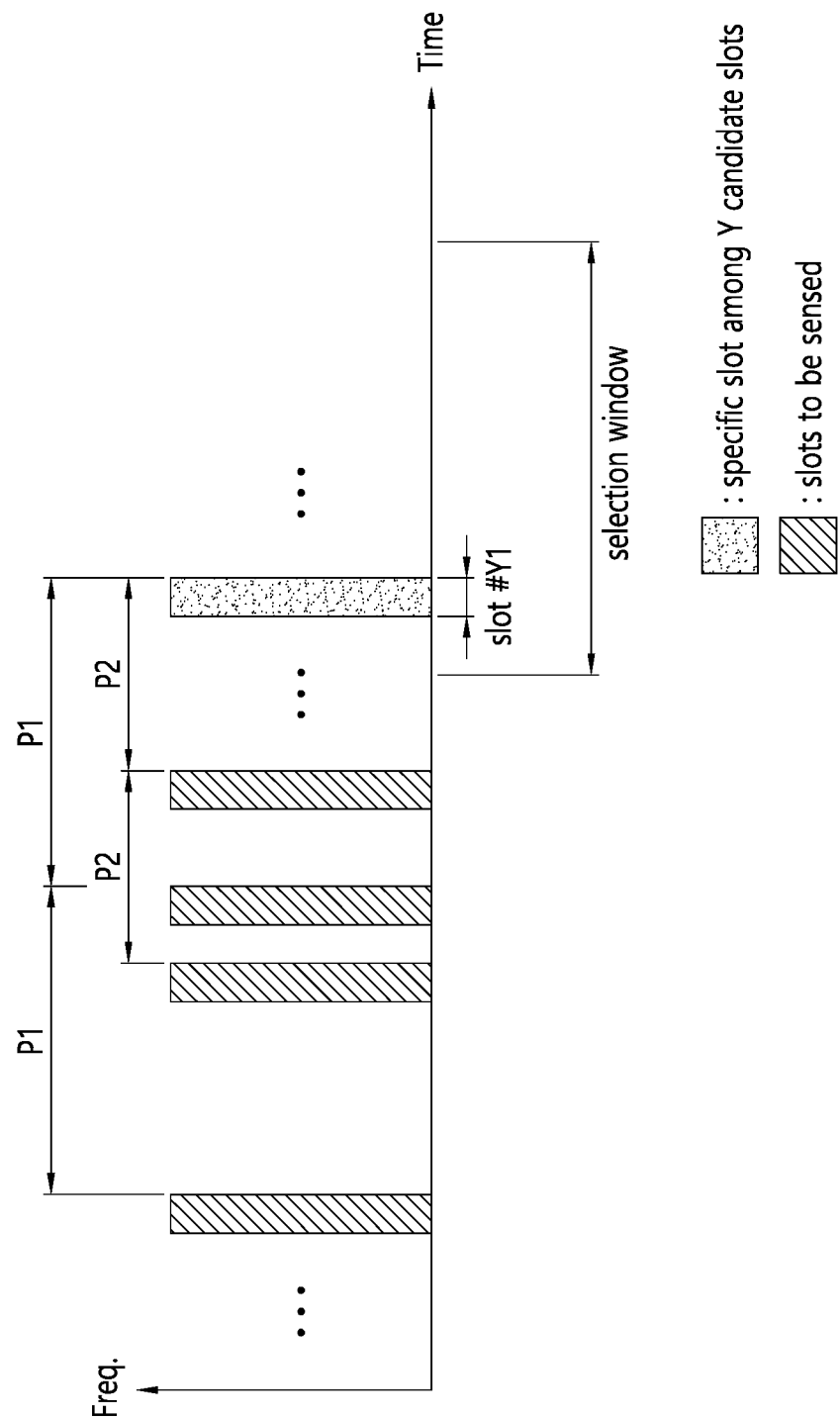

FIG. 9 and FIG. 10 show a method for a UE to perform PBPS, based on an embodiment of the present disclosure. The embodiments of FIG. 9 and FIG. 10 may be combined with various embodiments of the present disclosure.

In the embodiments of FIG. 9 and FIG. 10, it is assumed that resource reservation periods allowed for a resource pool or resource reservation periods configured for PBPS is P1 and P2. Furthermore, it is assumed that the UE performs partial sensing (i.e., PBPS) for selecting a SL resource in the slot #Y1.

Referring to FIG. 9, the UE may perform sensing for a slot located before P1 from the slot #Y1 and a slot located before P2 from the slot #Y1. In the embodiment of FIG. 9, the UE may perform monitoring for the most recent sensing occasion.

Referring to FIG. 10, the UE may perform sensing for a slot located before P1 from the slot #Y1 and a slot located before P2 from the slot #Y1. Furthermore, optionally, the UE may perform sensing for a slot located before 2*P1 from the slot #Y1 and a slot located before 2*P2 from the slot

Y1. In the embodiment of FIG. 10, the UE may perform monitoring for the most recent sensing occasion and the last sensing occasion before the most recent sensing occasion.

For example, in various embodiments of the present disclosure, continuous partial sensing (CPS) may refer to an operation of sensing all or a part of a time domain given as a specific configured value. For example, the CPS may include a short-term sensing operation in which sensing is performed for a relatively short duration.

Figure 11:
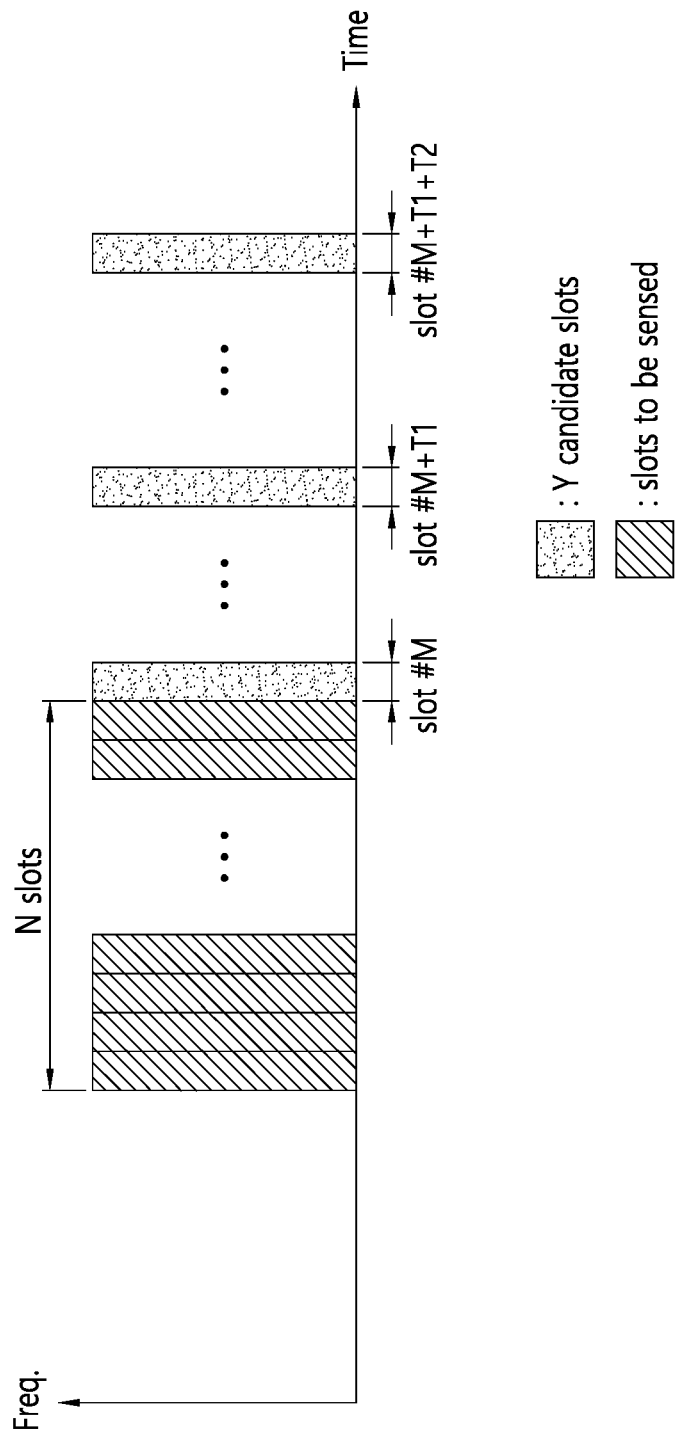
FIG. 11 shows a method for a UE to perform CPS, based on an embodiment of the present disclosure.

FIG. 11 shows a method for a UE to perform CPS, based on an embodiment of the present disclosure. The embodiment of FIG. 11 may be combined with various embodiments of the present disclosure.

In the embodiment of FIG. 11, it is assumed that Y candidate slots selected by the UE are the slot #M, the slot #(M+T1), and the slot #(M+T1+T2). In this case, slots in which the UE needs to perform sensing may be determined based on the first slot (i.e., slot #M) among Y candidate slots. For example, after determining the first slot among Y candidate slots as a reference slot, the UE may perform sensing for (previous) N slots from the reference slot.

Referring to FIG. 11, based on the first slot (i.e., slot #M) among Y candidate slots, the UE may perform sensing for N slots. For example, the UE may perform sensing for N slots before the slot #M, and the UE may select at least one SL resource from among Y candidate slots (i.e., slot #M, slot #(M+T1), and slot #(M+T1+T2)) based on a result of the sensing. For example, N may be configured or pre-configured for the UE. For example, a time gap for processing may exist between the last slot among the N slots and the slot #M.

In the present disclosure, partial sensing may include PBPS or CPS.

In the present disclosure, REV may refer to resource re-evaluation, and PEC may refer to resource pre-emption checking.

Hereinafter, the "candidate resource/slot" refers to a resource selected by the UE, which has selected a resource selection window to perform partial sensing, to detect whether there is a resource collision within the resource selection window when transmission resource selection is triggered for the first time to transmit any packet. The "available resource/slot" may refer to a resource which is determined to be available for transmission and reported from the PHY layer to the MAC layer because no resource collision is detected among candidate resources based on the partial sensing. The "transmission resource/slot" may refer to a resource finally selected by the MAC layer for SL transmission among the reported resources.

For example, if the UE performs partial sensing for the interval [n+T_A, n+T_B] (T_B>T_A) based on the time n at which SL transmission resource selection is triggered, T_B−T_A may be determined based on a maximum time interval between any two resources that can be signaled by SCI for SL transmission. For example, T_B−T_A may be determined as the maximum time interval between any two resources.

For example, in the case of aperiodic transmission, since the UE performs partial sensing after the time n and performs the aperiodic transmission through a resource selected based on a result of the partial sensing, T_B or the length of a partial sensing window may be determined based on the remaining packet delay budget (PDB) for a transport packet. For example, the partial sensing window length (T_B−T_A) value may be determined as a minimum value among a specific configured value for a partial sensing window length and a value obtained by subtracting a resource selection window length from PDB (if REV and/or PEC is disabled in a resource pool) or a value obtained by subtracting a resource selection window length and a specific configured value configured as a time margin for REV/PEC from PDB (if REV and/or PEC is enabled in a resource pool). For example, if the PDB is less than or equal to a specific threshold, the UE may set T_B=T_A=0, and the UE may perform random resource selection.

For example, if HARQ feedback is enabled in a resource pool and HARQ feedback is enabled for a transport packet, a (initial) partial sensing window length may be configured to be greater than or equal to HARQ RTT. Through this, both any transmission and retransmission resource(s) for the transmission may be sensed.

For example, if the number of (continuous) HARQ NACKs is less than or equal to a specific threshold, in order for power saving, the UE may perform only PPS-type partial sensing and may not perform CPS-type partial sensing for periodic transmission, and the UE may not perform CPS-type partial sensing and may perform random resource selection for aperiodic transmission.

For example, if a value of CBR or channel occupancy ratio (CR) value is less than or equal to a specific threshold, in order for power saving, the UE may perform only PPS-type partial sensing and may not perform CPS-type partial sensing for periodic transmission, and the UE may not perform CPS-type partial sensing and may perform random resource selection for aperiodic transmission.

For example, if a requirement for power saving or battery life of the UE is greater than or equal to a specific threshold, in order for power saving, the UE may perform only PPS-type partial sensing and may not perform CPS-type partial sensing for periodic transmission, and the UE may not perform CPS-type partial sensing and may perform random resource selection for aperiodic transmission.

For example, if a minimum communication distance value (i.e., minimum communication range requirement) for a HARQ feedback enabled transport packet is less than or equal to a specific threshold, in order for power saving, the UE may perform only PPS-type partial sensing and may not perform CPS-type partial sensing for periodic transmission, and the UE may not perform CPS-type partial sensing and may perform random resource selection for aperiodic transmission.

For example, if a priority value of a transport packet is less than or equal to a specific threshold, in order for power saving, the UE may perform only PPS-type partial sensing and may not perform CPS-type partial sensing for periodic transmission, and the UE may not perform CPS-type partial sensing and may perform random resource selection for aperiodic transmission.

For example, if the remaining PDB value of a transport packet is less than or equal to a specific threshold, in order for power saving, the UE may perform only PPS-type partial sensing and may not perform CPS-type partial sensing for periodic transmission, and the UE may not perform CPS-type partial sensing and may perform random resource selection for aperiodic transmission.

For example, if the (remaining) total number of retransmissions of a transport packet is less than or equal to a specific threshold, in order for power saving, the UE may perform only PPS-type partial sensing and may not perform CPS-type partial sensing for periodic transmission, and the UE may not perform CPS-type partial sensing and may perform random resource selection for aperiodic transmission.

For example, based on at least one of the remaining PDB, the number of (consecutive) HARQ NACKs, the value of CBR or CR, the required battery life, the minimum communication range, the priority value of packet transmission and/or the (remaining) total number of retransmissions, the length of the partial sensing window may be adaptively adjusted.

For example, the above-described operation of adaptively adjusting the length of the partial sensing window or the above-described operation of not performing CPS-type partial sensing may cause interference with packet transmission with a high priority of other UEs, if REV or PEC is configured in a resource pool. Therefore, only if a priority value of packet transmission is less than or equal to a specific threshold, as described above, the UE may adaptively adjust the length of the partial sensing window or may not perform CPS-type partial sensing. For example, the specific threshold for the priority value of the packet transmission may be a pre-emption priority value configured in the resource pool. For example, the above-described operation of adaptively adjusting the length of the partial sensing window or the above-described operation of not performing CPS-type partial sensing may be performed only if REV or PEC is not configured in the resource pool.

For example, as described above, if the UE adaptively adjusts the length of the partial sensing window based on channel conditions or UE operation/requirements, the length of the partial sensing window that can be adjusted may be configured to be less than or equal to a maximum time interval between any two resources that can be signaled by SCI.

For example, as described above, if the UE adaptively adjusts the length of the partial sensing window based on channel conditions or UE operation/requirements, a maximum time interval between any two resources that can be signaled by SCI may be determined based on the length of the adaptively adjusted partial sensing window. For example, a maximum time interval between any two resources that can be signaled by SCI may be determined as the length of the adaptively adjusted partial sensing window, or may be determined to be greater than or equal to the length of the partial sensing window.

For example, if a minimum value of a CPS window length (min. Wcps) is configured to a specific threshold, and resource (re)selection for aperiodic transmission is triggered at slot n in time, and the UE performs CPS for the interval [n+T1, n+T2], a minimum value of a resource selection window length (min(T2−T1)) may be configured to a specific threshold based on a priority of packet transmission. For example, in the case described above, the resource selection window may be selected by being shifted in time by a time greater than or equal to the minimum value of the CPS window length (min. Wcps) from time n (e.g., T1≥min. Wcps).

Figure 12:
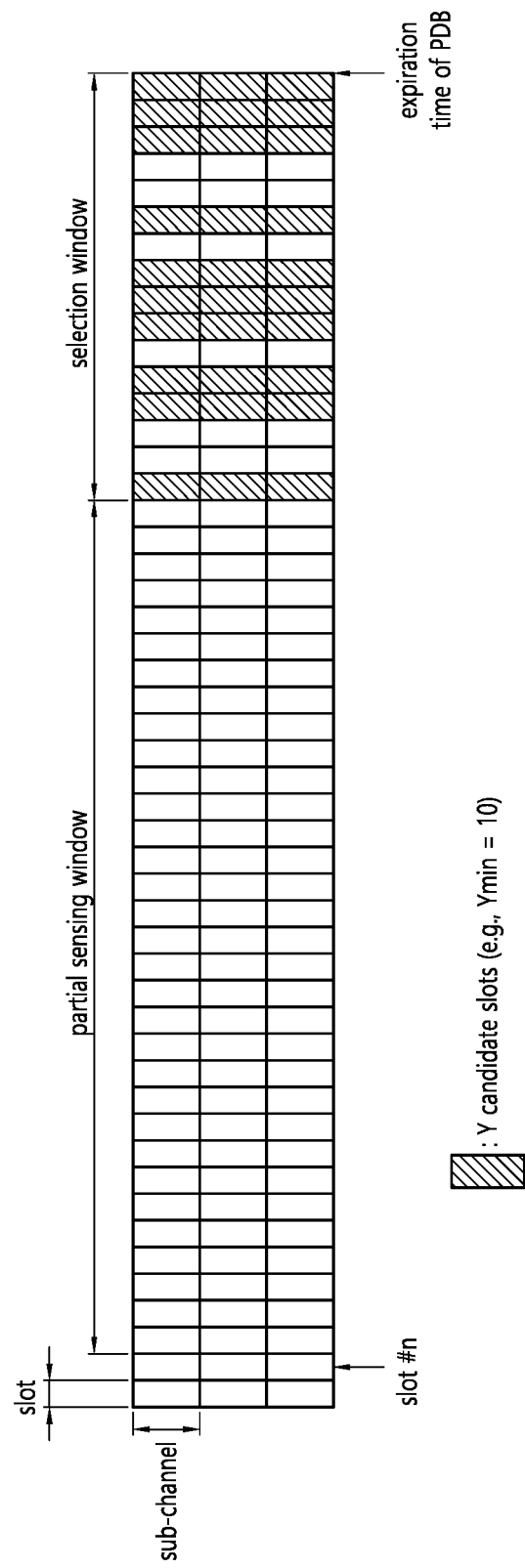
FIG. 12 shows a method for a UE to perform partial sensing, based on an embodiment of the present disclosure.

FIG. 12 shows a method for a UE to perform partial sensing, based on an embodiment of the present disclosure. The embodiment of FIG. 12 may be combined with various embodiments of the present disclosure.

Referring to FIG. 12, the UE may select Y candidate slots within a selection window determined within PDB. In the embodiment of FIG. 12, it is assumed that the minimum number of candidate slots (i.e., Ymin) is 10. In this case, if the resource selection procedure, the pre-emption procedure, or the re-evaluation procedure is triggered in the slot #n, the UE may perform monitoring within a partial sensing window, and the UE may select a candidate resource set within Y candidate slots based on the monitoring. In addition, the UE may select a SL transmission resource from the candidate resource set, and the UE may perform PSCCH/PSSCH transmission based on the SL transmission resource. In the embodiment of FIG. 12, it is assumed that the minimum length of the partial sensing window (i.e., the minimum number of sensing slots) is guaranteed.

Alternatively, for example, the minimum length of the partial sensing window (i.e., the minimum number of sensing slots) may not be guaranteed. For example, if packet delay budget (PDB) for a packet to be transmitted is less than a sum of the minimum value of the resource selection window length (min(T2−T1)) configured to the specific threshold and the minimum value of the CPS window length (min. Wcps) configured to the specific threshold, the UE may operate as follows.

(1) If the PDB is greater than or equal to a sum of a specific threshold configured separately (hereinafter Wps) which is less than the minimum value of the CPS window length (min. Wcps) and the minimum value of the resource selection window length (min(T2−T1)), the CPS window length may be shortened by adjusting to a value greater than or equal to the specific threshold configured separately (hereinafter Wps), and the UE may select resource(s) based on the CPS result.

(2) If the PDB is less than or equal to a sum of the specific threshold configured separately (hereinafter Wps) and the minimum value of the resource selection window length (min(T2−T1)), and the PDB is greater than or equal to the minimum value of the resource selection window length (min(T2−T1)), the UE may select resource(s) based on random resource selection in a resource pool to perform SL transmission.

(3) If the PDB is less than or equal to the minimum value of the resource selection window length (min(T2−T1)), the UE may transmit the packet by using resource(s) belonging to an exceptional resource pool (based on random selection), or the UE may drop transmission of the packet.

Figure 13:
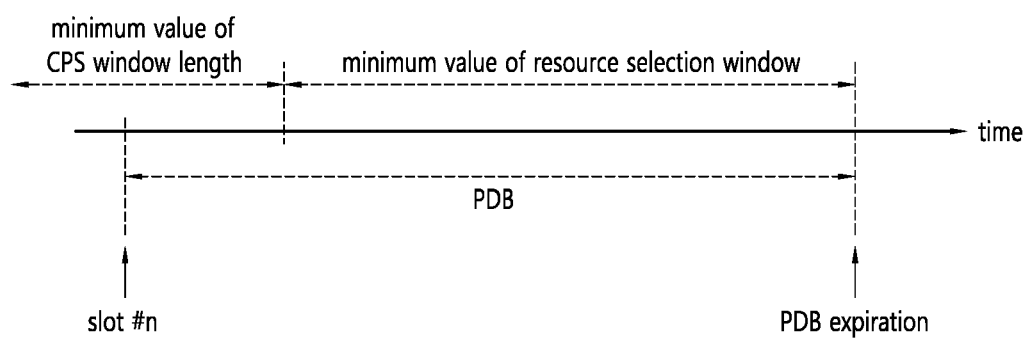
FIG. 13 shows an example in which PDB is less than a sum of a minimum value of a CPS window length and a minimum value of a resource selection window length and the PDB is greater than the minimum value of the resource selection window length, based on an embodiment of the present disclosure.

FIG. 13 shows an example in which PDB is less than a sum of a minimum value of a CPS window length and a minimum value of a resource selection window length and the PDB is greater than the minimum value of the resource selection window length, based on an embodiment of the present disclosure. The embodiment of FIG. 13 may be combined with various embodiments of the present disclosure.

Referring to FIG. 13, the PDB may be less than the sum of the minimum value of the CPS window length and the minimum value of the resource selection window length, and the PDB may be greater than the minimum value of the resource selection window length. In this case, the minimum value of the CPS window length may not be guaranteed after the slot #n. That is, the minimum length of the CPS window (i.e., the minimum number of sensing slots) may not be guaranteed.

Figure 14:
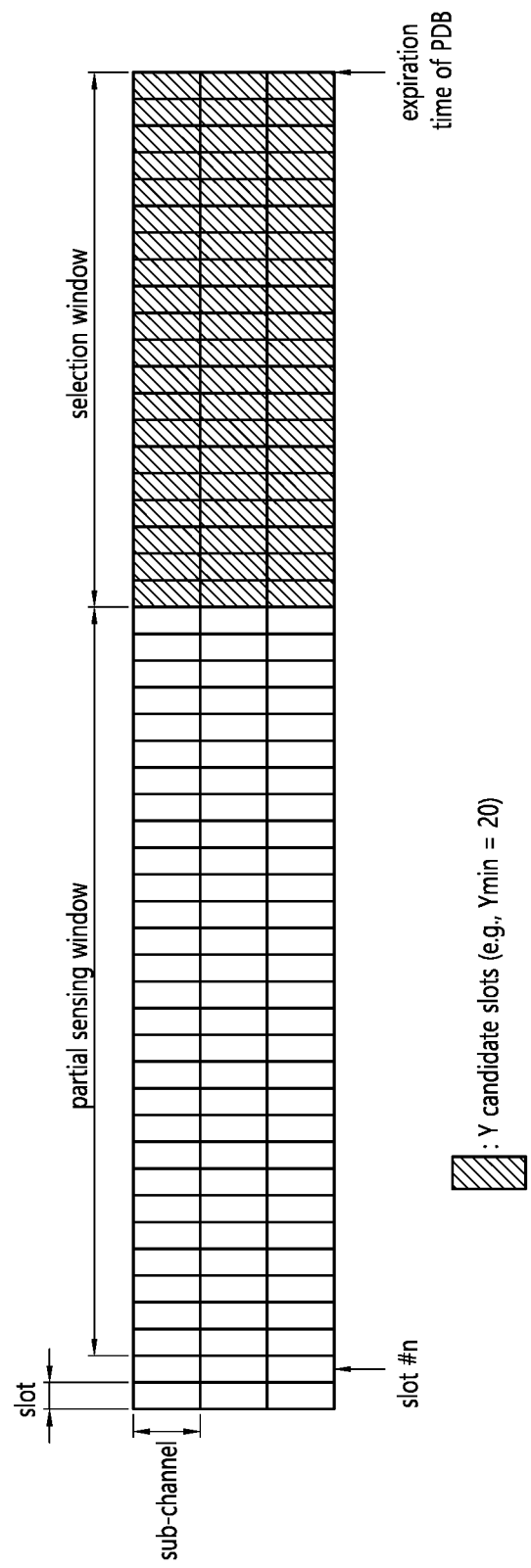
FIG. 14 shows a method for a UE to perform partial sensing, based on an embodiment of the present disclosure.

FIG. 14 shows a method for a UE to perform partial sensing, based on an embodiment of the present disclosure. The embodiment of FIG. 14 may be combined with various embodiments of the present disclosure.

Referring to FIG. 14, the UE may select Y candidate slots within a selection window determined within the PDB. In the embodiment of FIG. 14, it is assumed that the minimum number of candidate slots (i.e., Ymin) is 20. Furthermore, in the embodiment of FIG. 14, it is assumed that the minimum length of a partial sensing window (i.e., the minimum number of sensing slots) is not guaranteed. Specifically, for example, although the minimum number of sensing slots to be included in the partial sensing window is X (e.g., 31), only less than 31 sensing slots may exist after the slot #n, due to the minimum length of the selection window (i.e., minimum value of Y). In this case, if the resource selection procedure, the pre-emption procedure, or the re-evaluation procedure is triggered in the slot #n, the UE may select resource(s) in a resource pool based on random selection.

For example, the UE which selects resource(s) based on CPS may perform the following operation.

For aperiodic transmission, if PDB is greater than $W_{SELmin}$ and less than a sum of $W_{CPSmin}$ and $W_{SELmin}$, the UE performs continuous partial sensing on the remaining region except for the selection window within the PDB. If PDB is less than $W_{SELmin}$, the UE may perform random resource selection if allowed in a resource pool. Otherwise, the UE may stop transmission or perform random resource selection in an exceptional resource pool.

For aperiodic transmission, when resource (re)selection is triggered in slot n, if PDB is less than a sum of the minimum consecutive partial sensing window length ($W_{CPSmin}$) and the minimum selection window length ($W_{SELmin}$), and if the PDB is greater than $W_{SELmin}$, the UE may perform resource selection based on continuous partial sensing in the interval [n, n+PDB$-W_{SELmin}-T_{Poc,0}-T_{Poc,1}$]. Herein, $T_{proc,0}$ and $T_{proc,1}$ are the required UE processing time. Else if the PDB is equal to $W_{SELmin}$, the UE may perform random resource selection within the PDB in a resource pool, if allowed. Else, the UE may drop transmission, or the UE may perform random resource selection in an exceptional resource pool.

For example, if a MAC PDU or a logical channel to be transmitted is available in the MAC layer, the MAC layer may trigger the PHY layer to perform partial sensing. For example, in the above-described case, the MAC layer may trigger resource reporting to the PHY layer such that the PHY layer reports available resource(s) for resource (re)selection at the time within a specific threshold value "A" after the time when triggering the partial sensing.

For example, in the above case, the PHY layer may determine a resource selection window after the partial sensing is triggered from the MAC layer, and the PHY layer may select some or all of slots in the resource selection window as candidate resource(s)/slot(s), and the PHY layer may perform the partial sensing for identifying available resource(s) among the candidate resource(s)/slot(s).

For example, in the above case, the partial sensing window length (e.g., PPS or CPS window length) may be limited to be less than or equal to an interval between the resource reporting triggering time and the partial sensing triggering time indicated by the MAC layer. For example, in the case of PPS, the UE may perform PPS only for a sensing occasion belonging to the limited partial sensing window length among all sensing occasions for each transmission period for performing PPS. For example, in the case of CPS, the CPS window length may be selected to be less than or equal to the limited partial sensing window length.

For example, the above-described triggering and the partial sensing operation may be limited to be performed only when a timing of UE's aperiodic transmission or packet/logical channel/MAC PDU to be transmitted cannot be known in advance. For example, a resource selection window selected after the resource reporting triggering time may be selected within PDB of a packet to be transmitted.

For example, the above-described partial sensing triggering and associated resource reporting triggering and partial sensing operation may be limited to be performed only when PDB of a packet to be transmitted by the UE is greater than or equal to a specific threshold. For example, if the PDB of the packet to be transmitted by the UE is less than the specific threshold, the MAC layer may not perform the partial sensing triggering and may perform random resource selection triggering. For example, if the PDB of the packet to be transmitted by the UE is less than the specific threshold, the MAC layer may not perform the partial sensing triggering and may perform the resource reporting triggering.

For example, as described above, the UE may perform aperiodic transmission or may perform transmission in which the timing of the packet/logical channel/MAC PDU to be transmitted cannot be known in advance. In this case, if the PHY layer receives random resource selection triggering from the MAC layer, or if the PHY layer does not receive partial sensing triggering within the specific threshold value "A" and receives only resource reporting triggering, the UE may determine a resource selection window within PDB of the packet to be transmitted, and the UE may randomly select available resource(s) within the resource selection window and report it to the MAC layer.

For example, in the case of the above-described partial sensing triggering and associated resource reporting triggering and partial sensing operation, whether to perform the operation may be determined based on at least one of the remaining PDB for the packet to be transmitted, the number of (consecutive) HARQ NACKs, the value of CBR or CR, the required battery life, the minimum communication range, the priority value of packet transmission, the (remaining) total number of retransmissions, the minimum number of candidate/available/transmission resources to be selected, and/or whether the UE performs PPS.

For example, if partial sensing is configured and periodic transmission is allowed in a resource pool, a resource selection procedure for other periodic transmission may be performed in parallel when the UE performs resource selection for aperiodic transmission. In this case, when the UE simultaneously performs PPS for the periodic transmission resource selection and CPS for the aperiodic transmission resource selection, the UE may perform the following resource selection procedure.

(1) For example, if the number of candidate slots Y, which is selected by the UE for the other periodic transmission within a resource selection window for the aperiodic transmission, is greater than or equal to a specific threshold or the minimum number of candidate resources Ymin configured by the network, the UE may use/initialize only the Y candidate slots included in the resource selection window for the aperiodic transmission, as a set of candidate resources $S_A$ to be used in the resource selection procedure for the aperiodic transmission.

Otherwise, if the number of candidate slots Y, which is selected by the UE for the other periodic transmission within the resource selection window for the aperiodic transmission, is less than the specific threshold or the minimum number of candidate resources Ymin configured by the network, and if the number of resources belonging to the union of Y candidate slots belonging to the resource selection window for the aperiodic transmission and candidate resources/slots (or single-slot resource) for which a result of the CPS performed for the aperiodic transmission resource selection is/will be available within the resource selection window for the aperiodic transmission is greater than or equal to the Ymin or the specific threshold, the UE may use/initialize only the union of the Y candidate slots included in the resource selection window for the aperiodic transmission and the candidate resources/slots (or single-slot resource) for which the result of the CPS is/will be available, as a set of candidate resources $S_A$ to be used in the resource selection procedure for the aperiodic transmission.

If it does not correspond to the above two cases, the UE may use/initialize all candidate resources/slots (or single-slot resources) included in the resource selection window for the aperiodic transmission, as a set of candidate resources $S_A$ for the aperiodic transmission.

(2) For example, if the number of resources belonging to the union of Y candidate slots selected for the other periodic transmission included in the resource selection window for the aperiodic transmission and candidate resources/slots (or single-slot resource) for which a result of the CPS performed for the aperiodic transmission resource selection is/will be available within the resource selection window for the aperiodic transmission is greater than or equal to Ymin or the specific threshold, the UE may use/initialize only the union of the Y candidate slots included in the resource selection window for the aperiodic transmission and the candidate resources/slots (or single-slot resource) for which the result of the CPS is/will be available, as a set of candidate resources $S_A$ to be used in the resource selection procedure for the aperiodic transmission.

If it does not correspond to the above case, the UE may use/initialize all candidate resources/slots (or single-slot resources) included in the resource selection window for the aperiodic transmission, as a set of candidate resources $S_A$ to be used in the resource selection procedure for the aperiodic transmission.

(3) For example, the UE may use/initialize as a set of candidate resources $S_A$ to be used in the resource selection procedure for the aperiodic transmission with the following priorities.

(A) If the number of candidate slots for which a result of the CPS performed for the aperiodic transmission is/will be available, among Y candidate slots for the other periodic transmission included in the resource selection window for the aperiodic transmission, is greater than or equal to the Ymin or the specific threshold, the UE may use/initialize only candidate slots for which the result of the CPS performed for the periodic transmission included in the resource selection window for the aperiodic transmission is/will be available, as a set of candidate resources $S_A$ to be used in the resource selection procedure for the aperiodic transmission.

(B) Otherwise, if the condition of operation (A) is not satisfied, if the number of resources belonging to the union of Y candidate slots selected for the other periodic transmission included in the resource selection window for the aperiodic transmission and candidate resources/slots (or single-slot resource) for which a result of the CPS performed for the aperiodic transmission resource selection is/will be available within the resource selection window for the aperiodic transmission is greater than or equal to Ymin or the specific threshold, the UE may use/initialize only the union of the Y candidate slots included in the resource selection window for the aperiodic transmission and the candidate resources/slots (or single-slot resource) for which the result of the CPS is/will be available, as a set of candidate resources $S_A$ to be used in the resource selection procedure for the aperiodic transmission.

(C) Otherwise, if the conditions of the above-described (A) and (B) operation are not satisfied, the UE may use/initialize all candidate resources/slots (or single-slot resources) included in the resource selection window for the aperiodic transmission, as a set of candidate resources $S_A$ to be used in the resource selection procedure for the aperiodic transmission.

Based on various embodiments of the present disclosure, a partial sensing window length and a sensing time may be optimized in consideration of channel status and UE power consumption. Through this, the UE can efficiently use resources, and power consumption of the UE can be minimized.

Based on various embodiments of the present disclosure, if the minimum number of slots for partial sensing is not guaranteed, the UE may select resource(s) in a resource pool based on random selection. Through this, the UE may not perform unnecessary sensing in which accuracy is not guaranteed, and power consumption of the UE can be reduced.

For example, whether the rule is applied and/or the parameter value related to the proposed method/rule may be configured/allowed specifically (or differently or independently) for a service type. For example, whether the rule is applied and/or the parameter value related to the proposed method/rule may be configured/allowed specifically (or differently or independently) for a (LCH or service) priority. For example, whether the rule is applied and/or the parameter value related to the proposed method/rule may be configured/allowed specifically (or differently or independently) for a QoS requirement (e.g., latency, reliability, minimum communication range). For example, whether the rule is applied and/or the parameter value related to the proposed method/rule may be configured/allowed specifically (or differently or independently) for a PQI parameter. For example, whether the rule is applied and/or the parameter value related to the proposed method/rule may be configured/allowed specifically (or differently or independently) for HARQ feedback enabled LCH/MAC PDU (transmission). For example, whether the rule is applied and/or the parameter value related to the proposed method/rule may be configured/allowed specifically (or differently or independently) for HARQ feedback disabled LCH/MAC PDU (transmission). For example, whether the rule is applied and/or the parameter value related to the proposed method/rule may be configured/allowed specifically (or differently or independently) for a CBR measurement value of a resource pool. For example, whether the rule is applied and/or the parameter value related to the proposed method/rule may be configured/allowed specifically (or differently or independently) for a SL cast type (e.g., unicast, groupcast, broadcast). For example, whether the rule is applied and/or the parameter value related to the proposed method/rule may be configured/allowed specifically (or differently or independently) for a SL groupcast HARQ feedback option (e.g., NACK only feedback, ACK/NACK feedback, NACK only feedback based on TX-RX distance). For example, whether the rule is applied and/or the parameter value related to the proposed method/rule may be configured/allowed specifically (or differently or independently) for a SL mode 1 CG type (e.g., SL CG type 1 or SL CG type 2). For example, whether the rule is applied and/or the parameter value related to the proposed method/rule may be configured/allowed specifically (or differently or independently) for a SL mode type (e.g., mode 1 or mode 2). For example, whether the rule is applied and/or the parameter value related to the proposed method/rule may be configured/allowed specifically (or differently or independently) for a resource pool. For example, whether the rule is applied and/or the parameter value related to the proposed method/rule may be configured/allowed specifically (or differently or independently) for whether a PSFCH resource is configured in a resource pool. For example, whether the rule is applied and/or the parameter value related to the proposed method/rule may be configured/allowed specifically (or differently or independently) for a source (L2) ID. For example, whether the rule is applied and/or the parameter value related to the proposed method/rule may be configured/allowed specifically (or differently or independently) for a destination (L2) ID. For example, whether the rule is applied and/or the parameter value related to the proposed method/rule may be configured/allowed specifically (or differently or independently) for a PC5 RRC connection link. For example, whether the rule is applied and/or the parameter value related to the proposed method/rule may be configured/allowed specifically (or differently or independently) for a SL link. For example, whether the rule is applied and/or the parameter value related to the proposed method/rule may be configured/allowed specifically (or differently or independently) for a connection state (with a base station) (e.g., RRC CONNECTED state, IDLE state, INACTIVE state). For example, whether the rule is applied and/or the parameter value related to the proposed method/rule may be configured/allowed specifically (or differently or independently) for a SL HARQ process (ID). For example, whether the rule is applied and/or the parameter value related to the proposed method/rule may be configured/ allowed specifically (or differently or independently) for whether to perform SL DRX operation (of TX UE or RX UE). For example, whether the rule is applied and/or the parameter value related to the proposed method/rule may be configured/allowed specifically (or differently or independently) for whether a UE is a power saving (TX or RX) UE. For example, whether the rule is applied and/or the parameter value related to the proposed method/rule may be configured/allowed specifically (or differently or independently) for a case in which PSFCH TX and PSFCH RX (and/or a plurality of PSFCH TXs (exceeding UE capability)) overlap (and/or a case in which PSFCH TX (and/or PSFCH RX) is skipped) (from a specific UE perspective). For example, whether the rule is applied and/or the parameter value related to the proposed method/rule may be configured/allowed specifically (or differently or independently) for a case in which the RX UE actually (successfully) receives PSCCH (and/or PSSCH) (re)transmission from the TX UE.

For example, in the present disclosure, the term "configured/configuration (or designated/designation)" can be extended/interpreted to/as that the base station informs the UE through a pre-defined (physical layer or higher layer) channel/signal (e.g., SIB, RRC, MAC CE) (and/or being provided through pre-configuration and/or that the UE informs other UEs through a pre-defined (physical layer or higher layer) channel/signal (e.g., SL MAC CE, PC5 RRC)).

For example, in the present disclosure, the term "PSFCH" can be extended/interpreted to/as (NR or LTE) PSSCH (and/or (NR or LTE) PSCCH) (and/or (NR or LTE) SL SSB (and/or UL channel/signal)). In addition, the proposed methods of the present disclosure can be used in combination with each other (as a new type of manner).

For example, in the present disclosure, the specific threshold may refer to a threshold pre-defined or (pre-)configured by a higher layer (including an application layer) of the network, the base station, or the UE. For example, in the present disclosure, the specific configured value may refer to a value pre-defined or (pre-)configured by a higher layer (including an application layer) of the network, the base station, or the UE. For example, the operation configured by the network/base station may refer to that the base station (pre-)configures to the UE through higher layer RRC signaling or the base station configures/signals to the UE through MAC CE or the base station signals to the UE through DCI.

Figure 15:
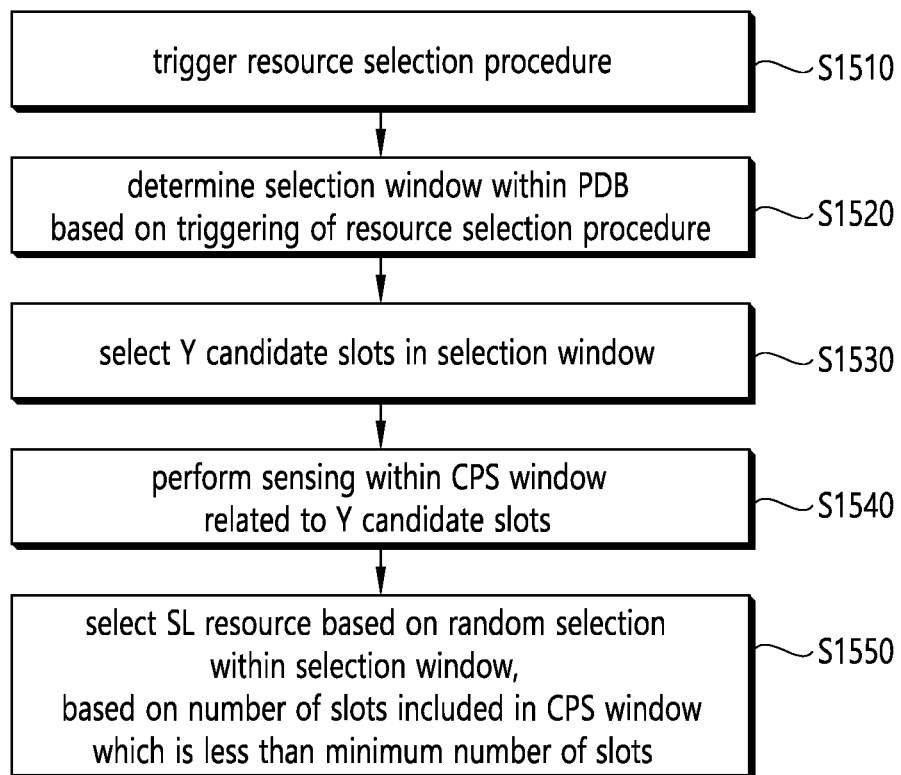
FIG. 15 shows a method for a first device to perform wireless communication, based on an embodiment of the present disclosure.

FIG. 15 shows a method for a first device to perform wireless communication, based on an embodiment of the present disclosure. The embodiment of FIG. 15 may be combined with various embodiments of the present disclosure.

Referring to FIG. 15, in step S1510, the first device may trigger a resource selection procedure. In step S1520, the first device may determine a selection window within a packet delay budget (PDB) based on the triggering of the resource selection procedure. In step S1530, the first device may select Y candidate slots in the selection window. In step S1540, the first device may perform sensing within a contiguous partial sensing (CPS) window related to the Y candidate slots. In step S1550, the first device may select a sidelink (SL) resource based on random selection within the selection window, based on the number of slots included in the CPS window which is less than a minimum number of slots. For example, Y may be a positive integer.

In addition, for example, the first device may obtain information related to a resource pool. For example, the SL resource may be selected in the resource pool based on the random selection.

For example, the Y candidate slots may be selected within the selection window such that Y is greater than or equal to a minimum number of candidate slots.

For example, information related to the minimum number of slots may be configured for the first device.

For example, the first device may be allowed not to perform the sensing within the CPS window related to the Y candidate slots, based on a number of hybrid automatic repeat request (HARQ) negative acknowledgment (NACK) receptions being less than or equal to a threshold.

For example, the first device may be allowed not to perform the sensing within the CPS window related to the Y candidate slots, based on a channel congestion level being less than or equal to a threshold.

For example, the first device may be allowed not to perform the sensing within the CPS window related to the Y candidate slots, based on the resource selection procedure being triggered for SL transmission with a minimum communication range requirement which is less than or equal to a threshold.

For example, the first device may be allowed not to perform the sensing within the CPS window related to the Y candidate slots, based on the resource selection procedure being triggered for SL transmission with a priority value which is less than or equal to a threshold.

For example, the first device may be allowed not to perform the sensing within the CPS window related to the Y candidate slots, based on the resource selection procedure being triggered for SL transmission with a number of transmissions which is less than or equal to a threshold.

In addition, for example, the first device may determine a partial sensing window. For example, a length of the partial sensing window may be determined by the first device, based on at least one of the PDB, a number of HARQ NACK receptions, a channel busy ratio (CBR) value, a channel occupancy ratio (CR) value, a required battery life, a minimum communication range requirement, a priority value related to packet transmission, or a total number of transmissions. For example, a maximum time interval between SL resources may be determined based on the length of the partial sensing window. In addition, for example, the first device may trigger a report for a set of candidate resources. For example, the length of the partial sensing window may be less than or equal to an interval between a time when the resource selection procedure is triggered and a time when the report for the set of candidate resources is triggered.

The proposed method can be applied to the device(s) based on various embodiments of the present disclosure. First, the processor 102 of the first device 100 may trigger a resource selection procedure. In addition, the processor 102 of the first device 100 may determine a selection window within a packet delay budget (PDB) based on the triggering of the resource selection procedure. In addition, the processor 102 of the first device 100 may select Y candidate slots in the selection window. In addition, the processor 102 of the first device 100 may perform sensing within a contiguous partial sensing (CPS) window related to the Y candidate slots. In addition, the processor 102 of the first device 100 may select a sidelink (SL) resource based on random selection within the selection window, based on the number of slots included in the CPS window which is less than a minimum number of slots. For example, Y may be a positive integer.

Based on an embodiment of the present disclosure, a first device adapted to perform wireless communication based on partial sensing may be provided. For example, the first device may comprise: one or more memories storing instructions; one or more transceivers; and one or more processors connected to the one or more memories and the one or more transceivers. For example, the one or more processors may execute the instructions to: trigger a resource selection procedure; determine a selection window within a packet delay budget (PDB) based on the triggering of the resource selection procedure; select Y candidate slots in the selection window; perform sensing within a contiguous partial sensing (CPS) window related to the Y candidate slots; and select a sidelink (SL) resource based on random selection within the selection window, based on the number of slots included in the CPS window which is less than a minimum number of slots, wherein Y is a positive integer.

Based on an embodiment of the present disclosure, a processing device adapted to control a first device adapted to perform wireless communication based on partial sensing may be provided. For example, the processing device may comprise: one or more processors; and one or more memories operably connected to the one or more processors and storing instructions. For example, the one or more processors may execute the instructions to: trigger a resource selection procedure; determine a selection window within a packet delay budget (PDB) based on the triggering of the resource selection procedure; select Y candidate slots in the selection window; perform sensing within a contiguous partial sensing (CPS) window related to the Y candidate slots; and select a sidelink (SL) resource based on random selection within the selection window, based on the number of slots included in the CPS window which is less than a minimum number of slots, wherein Y is a positive integer.

Based on an embodiment of the present disclosure, a non-transitory computer-readable storage medium storing instructions may be provided. For example, the non-transitory computer-readable storage medium storing instructions, when executed, may cause a first device to: trigger a resource selection procedure; determine a selection window within a packet delay budget (PDB) based on the triggering of the resource selection procedure; select Y candidate slots in the selection window; perform sensing within a contiguous partial sensing (CPS) window related to the Y candidate slots; and select a sidelink (SL) resource based on random selection within the selection window, based on the number of slots included in the CPS window which is less than a minimum number of slots, wherein Y is a positive integer.

Figure 16:
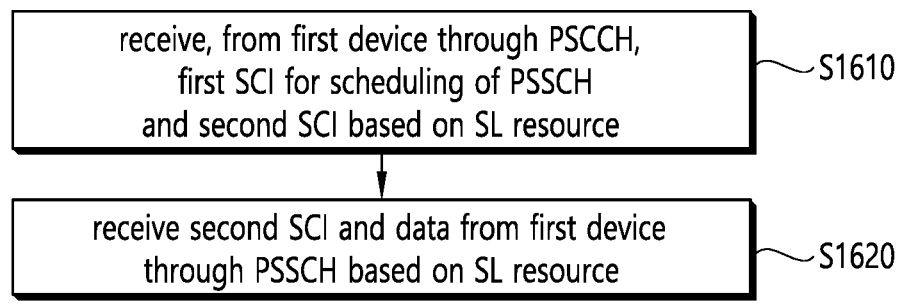
FIG. 16 shows a method for a second device to perform wireless communication, based on an embodiment of the present disclosure.

FIG. 16 shows a method for a second device to perform wireless communication, based on an embodiment of the present disclosure. The embodiment of FIG. 16 may be combined with various embodiments of the present disclosure.

Referring to FIG. 16, in step S1610, the second device may receive, from a first device through a physical sidelink control channel (PSCCH), first sidelink control information (SCI) for scheduling of a physical sidelink shared channel (PSSCH) and second SCI based on a sidelink (SL) resource. In step S1620, the second device may receive the second SCI and data from the first device through the PSSCH based on the SL resource. For example, based on the number of slots included in a contiguous partial sensing (CPS) window related to Y candidate slots being less than the minimum number of slots, the SL resource is selected by the first device within a selection window based on random selection. For example, Y may be a positive integer.

The proposed method can be applied to the device(s) based on various embodiments of the present disclosure. First, the processor 202 of the second device 200 may control the transceiver 206 to receive, from a first device through a physical sidelink control channel (PSCCH), first sidelink control information (SCI) for scheduling of a physical sidelink shared channel (PSSCH) and second SCI based on a sidelink (SL) resource. In addition, the processor 202 of the second device 200 may control the transceiver 206 to receive the second SCI and data from the first device through the PSSCH based on the SL resource. For example, based on the number of slots included in a contiguous partial sensing (CPS) window related to Y candidate slots being less than the minimum number of slots, the SL resource is selected by the first device within a selection window based on random selection. For example, Y may be a positive integer.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device through a physical sidelink control channel (PSCCH), first sidelink control information (SCI) for scheduling of a physical sidelink shared channel (PSSCH) and second SCI based on a sidelink (SL) resource; and receive the second SCI and data from the first device through the PSSCH based on the SL resource. For example, based on the number of slots included in a contiguous partial sensing (CPS) window related to Y candidate slots being less than the minimum number of slots, the SL resource is selected by the first device within a selection window based on random selection. For example, Y may be a positive integer.

Based on an embodiment of the present disclosure, a processing device adapted to control a second device adapted to perform wireless communication may be provided. For example, the processing device may comprise: one or more processors; and one or more memories operably connected to the one or more processors and storing instructions. For example, the one or more processors may execute the instructions to: receive, from a first device through a physical sidelink control channel (PSCCH), first sidelink control information (SCI) for scheduling of a physical sidelink shared channel (PSSCH) and second SCI based on a sidelink (SL) resource; and receive the second SCI and data from the first device through the PSSCH based on the SL resource. For example, based on the number of slots included in a contiguous partial sensing (CPS) window related to Y candidate slots being less than the minimum number of slots, the SL resource is selected by the first device within a selection window based on random selection. For example, Y may be a positive integer.

Based on an embodiment of the present disclosure, a non-transitory computer-readable storage medium storing instructions may be provided. For example, the non-transitory computer-readable storage medium storing instructions, when executed, may cause a second device to: receive, from a first device through a physical sidelink control channel (PSCCH), first sidelink control information (SCI) for scheduling of a physical sidelink shared channel (PSSCH) and second SCI based on a sidelink (SL) resource; and receive the second SCI and data from the first device through the PSSCH based on the SL resource. For example, based on the number of slots included in a contiguous partial sensing (CPS) window related to Y candidate slots being less than the minimum number of slots, the SL resource is selected by the first device within a selection window based on random selection. For example, Y may be a positive integer.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
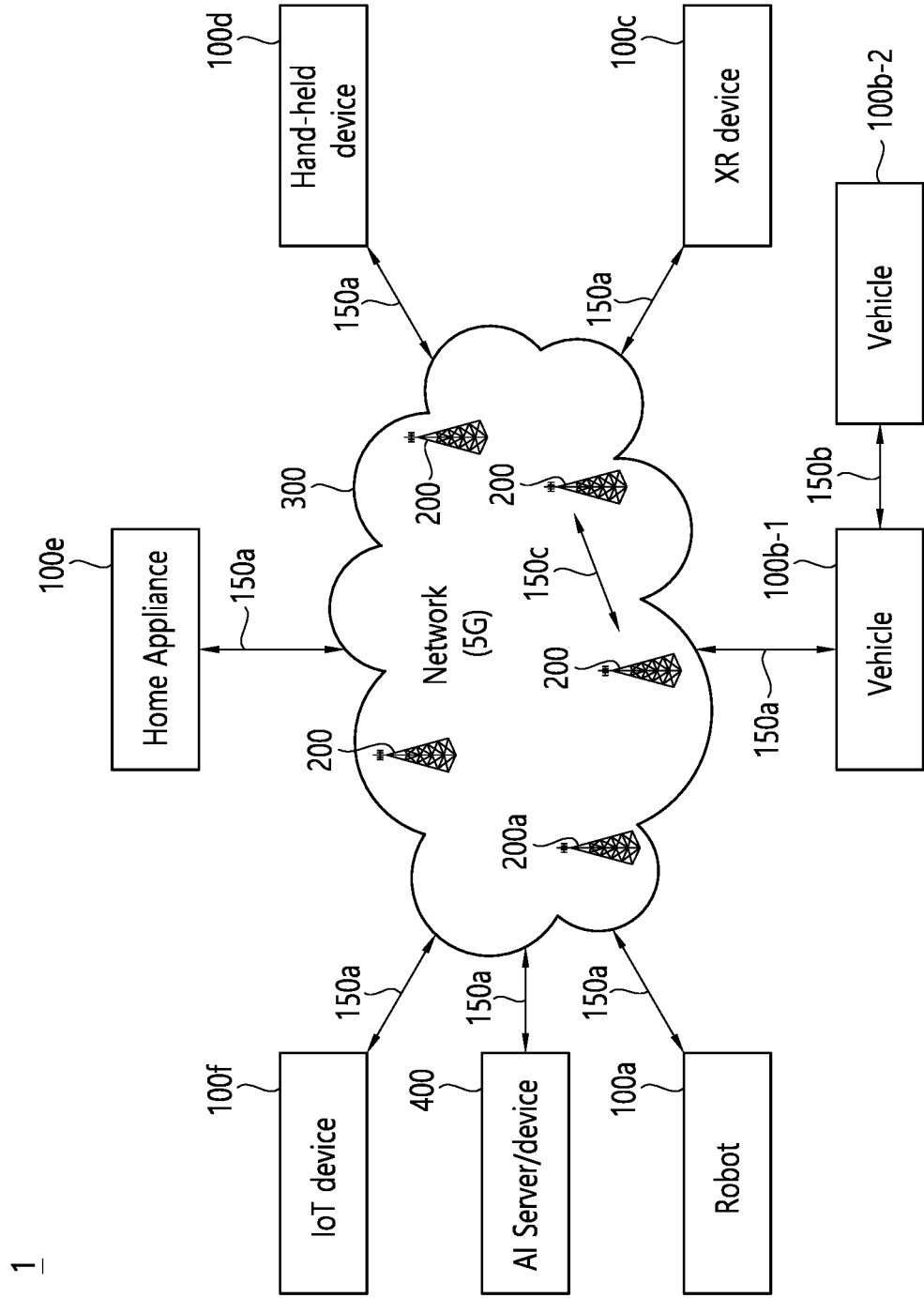
FIG. 17 shows a communication system 1, based on an embodiment of the present disclosure.

FIG. 17 shows a communication system 1, based on an embodiment of the present disclosure. The embodiment of FIG. 17 may be combined with various embodiments of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
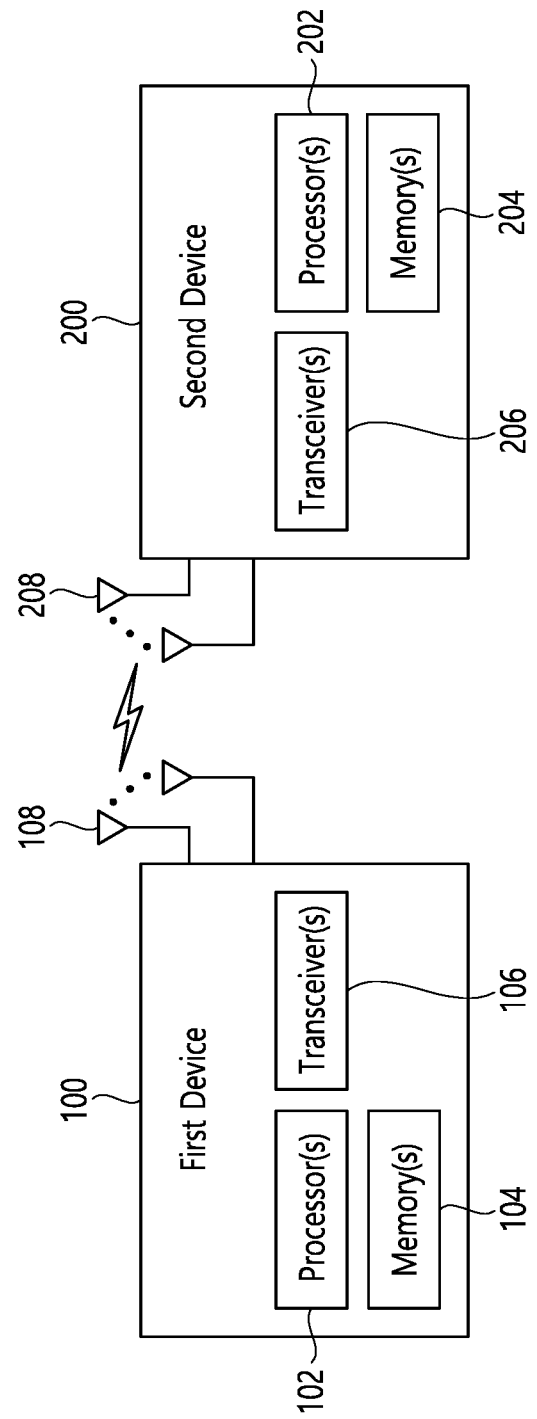
FIG. 18 shows wireless devices, based on an embodiment of the present disclosure.

FIG. 18 shows wireless devices, based on an embodiment of the present disclosure. The embodiment of FIG. 18 may be combined with various embodiments of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
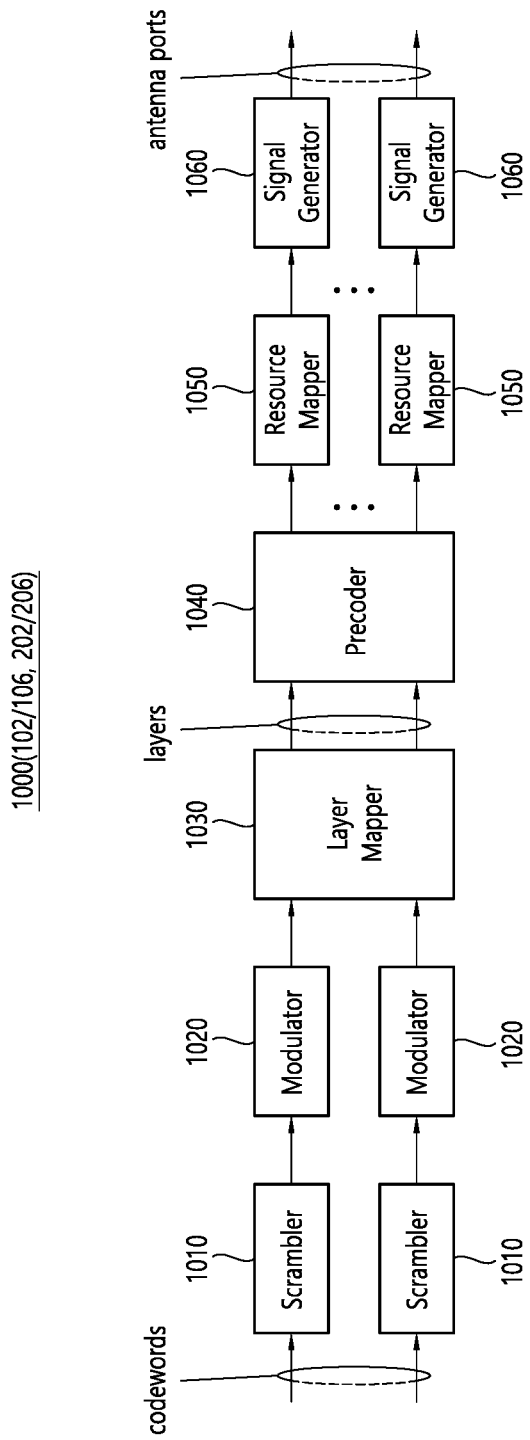
FIG. 19 shows a signal process circuit for a transmission signal, based on an embodiment of the present disclosure.

FIG. 19 shows a signal process circuit for a transmission signal, based on an embodiment of the present disclosure. The embodiment of FIG. 19 may be combined with various embodiments of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
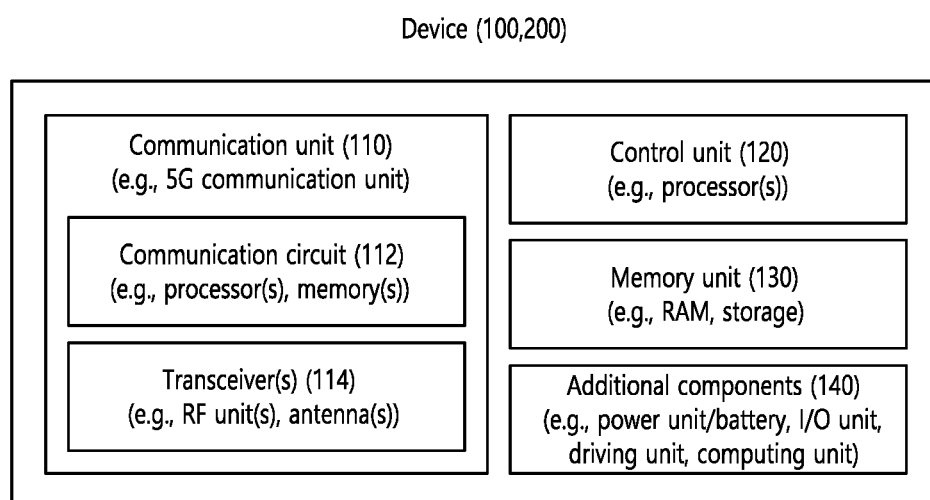
FIG. 20 shows another example of a wireless device, based on an embodiment of the present disclosure.

FIG. 20 shows another example of a wireless device, based on an embodiment of the present disclosure. The wireless device may be implemented in various forms according to a use-case/service (refer to FIG. 17). The embodiment of FIG. 20 may be combined with various embodiments of the present disclosure.

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
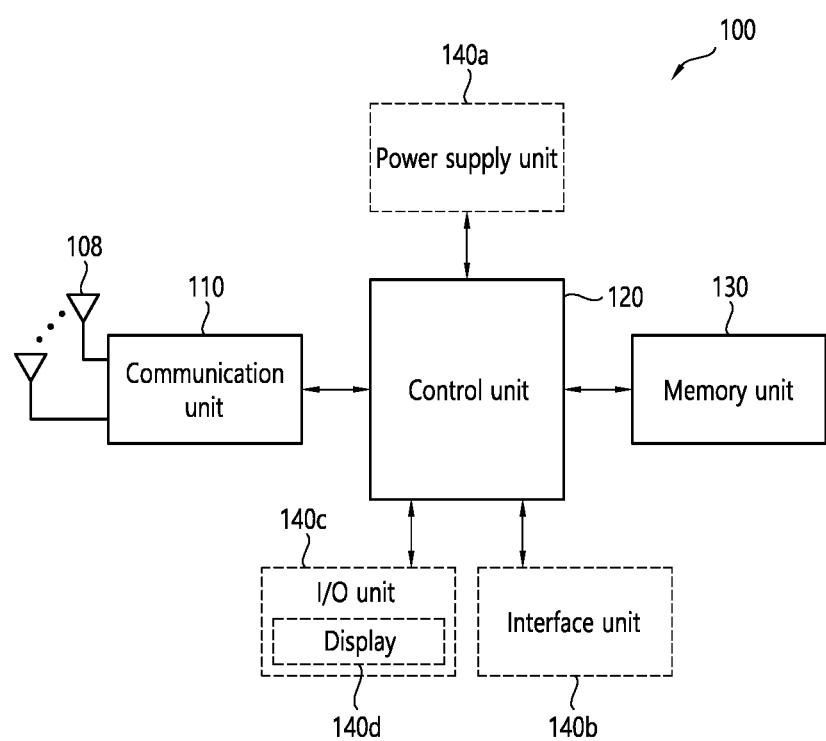
FIG. 21 shows a hand-held device, based on an embodiment of the present disclosure.

FIG. 21 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 21 may be combined with various embodiments of the present disclosure.

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
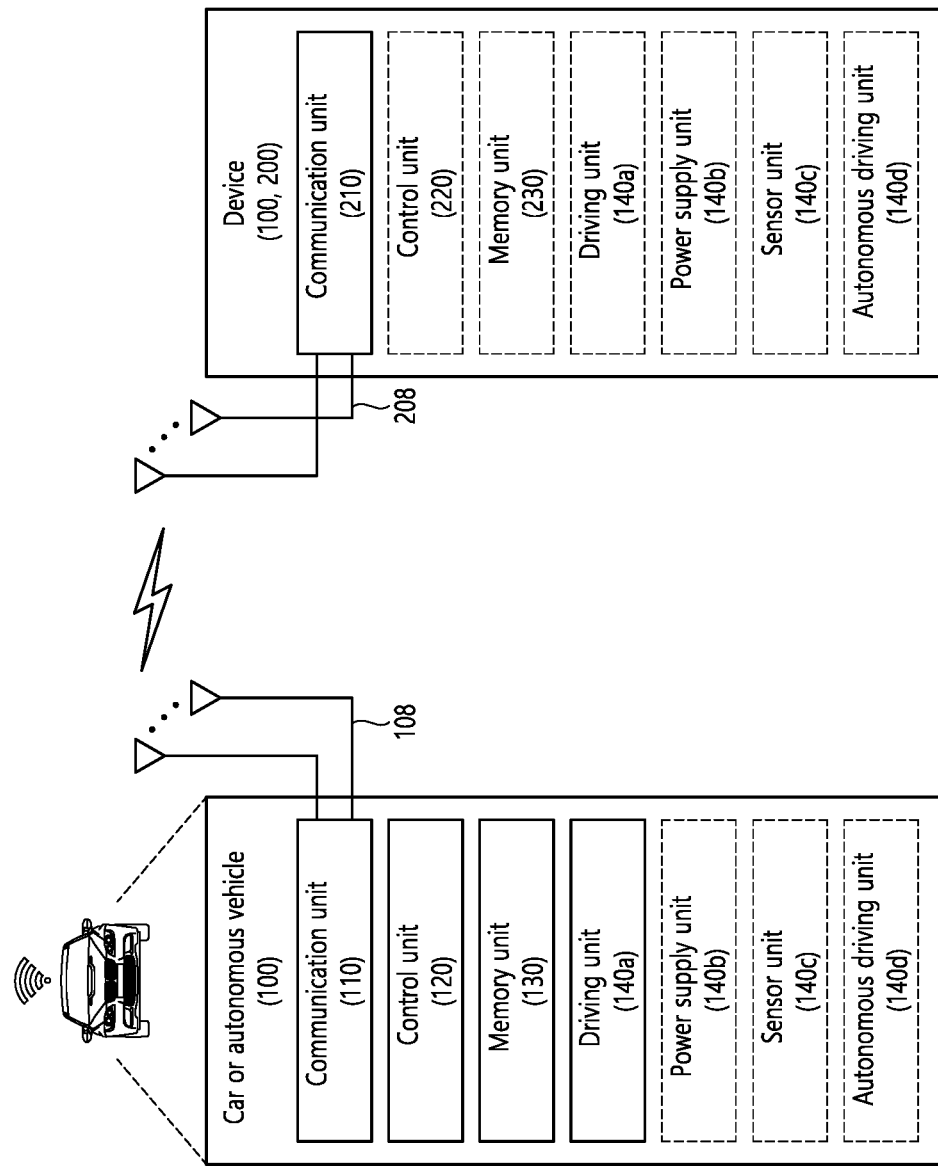
FIG. 22 shows a vehicle or an autonomous vehicle, based on an embodiment of the present disclosure.

FIG. 22 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 22 may be combined with various embodiments of the present disclosure.

Referring to FIG. 22, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication based on partial sensing by a first device, the method comprising:
    triggering a resource selection procedure;
    determining a selection window within a packet delay budget (PDB) based on the triggering of the resource selection procedure;
    selecting Y candidate slots in the selection window;
    determining a contiguous partial sensing (CPS) window related to the Y candidate slots; and
    selecting a sidelink (SL) resource,
    wherein, based on that a number of slots included in the CPS window is less than a minimum number of slots for CPS, the SL resource is selected based on random selection from a resource pool,
    wherein, based on that the number of slots included in the CPS window is greater than or equal to the minimum number of slots for the CPS, the SL resource is selected based on the CPS in the Y candidate slots, and
    wherein Y is a positive integer.

2. The method of claim 1, wherein information related to the resource pool is configured for the first device.

3. The method of claim 1, wherein the Y candidate slots are selected within the selection window such that Y is greater than or equal to a minimum number of candidate slots.

4. The method of claim 1, wherein information related to the minimum number of slots for the CPS is configured for the first device.

5. The method of claim 1, wherein the first device is allowed not to perform sensing within the CPS window related to the Y candidate slots, based on a number of hybrid automatic repeat request (HARQ) negative acknowledgment (NACK) receptions being less than or equal to a threshold.

6. The method of claim 1, wherein the first device is allowed not to perform sensing within the CPS window related to the Y candidate slots, based on a channel congestion level being less than or equal to a threshold.

7. The method of claim 1, wherein the first device is allowed not to perform sensing within the CPS window related to the Y candidate slots, based on the resource selection procedure being triggered for SL transmission with a minimum communication range requirement which is less than or equal to a threshold.

8. The method of claim 1, wherein the first device is allowed not to perform sensing within the CPS window related to the Y candidate slots, based on the resource selection procedure being triggered for SL transmission with a priority value which is less than or equal to a threshold.

9. The method of claim 1, wherein the first device is allowed not to perform sensing within the CPS window related to the Y candidate slots, based on the resource selection procedure being triggered for SL transmission with a number of transmissions which is less than or equal to a threshold.

10. The method of claim 1, further comprising:
    determining a partial sensing window.

11. The method of claim 10, wherein a length of the partial sensing window is determined by the first device, based on at least one of the PDB, a number of HARQ NACK receptions, a channel busy ratio (CBR) value, a channel occupancy ratio (CR) value, a required battery life, a minimum communication range requirement, a priority value related to packet transmission, or a total number of transmissions.

12. The method of claim 10, wherein a maximum time interval between SL resources is determined based on the length of the partial sensing window.

13. The method of claim 10, further comprising:
triggering a report for a set of candidate resources,
wherein the length of the partial sensing window is less than or equal to an interval between a time when the resource selection procedure is triggered and a time when the report for the set of candidate resources is triggered.

14. A first device adapted to perform wireless communication based on partial sensing, the first device comprising:
at least one transceiver;
at least one processor; and
at least one memory connected to the at least one processor and storing instructions that, based on being executed by the at least one processor, cause the first device to perform operations comprising:
triggering a resource selection procedure;
determining a selection window within a packet delay budget (PDB) based on the triggering of the resource selection procedure;
selecting Y candidate slots in the selection window;
determining a contiguous partial sensing (CPS) window related to the Y candidate slots; and
selecting a sidelink (SL) resource,
wherein, based on that a number of slots included in the CPS window is less than a minimum number of slots for CPS, the SL resource is selected based on random selection from a resource pool,
wherein, based on that the number of slots included in the CPS window is greater than or equal to the minimum number of slots for the CPS, the SL resource is selected based on the CPS in the Y candidate slots, and
wherein Y is a positive integer.

15. The first device of claim 14, wherein information related to the resource pool is configured for the first device.

16. The first device of claim 14, wherein the Y candidate slots are selected within the selection window such that Y is greater than or equal to a minimum number of candidate slots.

17. The first device of claim 14, wherein information related to the minimum number of slots for the CPS is configured for the first device.

18. A processing device adapted to control a first device adapted to perform wireless communication based on partial sensing, the processing device comprising:
at least one processor; and
at least one memory connected to the at least one processor and storing instructions that, based on being executed by the at least one processor, cause the first device to perform operations comprising:
triggering a resource selection procedure;
determining a selection window within a packet delay budget (PDB) based on the triggering of the resource selection procedure;
selecting Y candidate slots in the selection window;
determining a contiguous partial sensing (CPS) window related to the Y candidate slots; and
selecting a sidelink (SL) resource,
wherein, based on that a number of slots included in the CPS window is less than a minimum number of slots for CPS, the SL resource is selected based on random selection from a resource pool,
wherein, based on that the number of slots included in the CPS window is greater than or equal to the minimum number of slots for the CPS, the SL resource is selected based on the CPS in the Y candidate slots, and
wherein Y is a positive integer.

19. The processing device of claim 18, wherein information related to the resource pool is configured for the first device.

20. The processing device of claim 18, wherein the Y candidate slots are selected within the selection window such that Y is greater than or equal to a minimum number of candidate slots, and
wherein information related to the minimum number of slots is configured for the first device.

* * * * *